(12) United States Patent
Pudiyapura

(10) Patent No.: US 12,615,222 B2
(45) Date of Patent: Apr. 28, 2026

---

(54) SYSTEMS AND METHODS FOR OPTIMIZING A PACKET CLASSIFICATION ALGORITHM FOR IMPLEMENTATION BY A PACKET PROCESSING PIPELINE

(71) Applicant: Pensando Systems Inc., Milpitas, CA (US)

(72) Inventor: Ajeer Salil Pudiyapura, Sunnyvale, CA (US)

(73) Assignee: Pensando Systems Inc., Milpitas, CA (US)

( * ) Notice: Subject to any disclaimer, the term of this patent is extended or adjusted under 35 U.S.C. 154(b) by 543 days.

(21) Appl. No.: 18/102,522

(22) Filed: Jan. 27, 2023

(65) Prior Publication Data

US 2024/0259330 A1 Aug. 1, 2024

(51) Int. Cl.
| | |
|---|---|
| *H04L 49/00* | (2022.01) |
| *H04L 45/74* | (2022.01) |
| *H04L 45/745* | (2022.01) |
| *H04L 47/20* | (2022.01) |
| *H04L 47/2441* | (2022.01) |

(52) U.S. Cl.
CPC ........ H04L 49/3063 (2013.01); H04L 45/742 (2013.01); H04L 45/745 (2013.01); H04L 47/20 (2013.01)

(58) Field of Classification Search
CPC . H04L 49/3063; H04L 45/742; H04L 45/745; H04L 47/20
See application file for complete search history.

(56) References Cited

U.S. PATENT DOCUMENTS

| | | | | |
|---|---|---|---|---|
| 6,633,860 B1 * | 10/2003 | Afek | ...................... | G06Q 40/04 705/37 |
| 7,796,541 B1 * | 9/2010 | Goel | ...................... | H04L 45/00 370/256 |
| 8,934,495 B1 * | 1/2015 | Hilton | ...................... | H04L 67/02 370/419 |
| 11,258,707 B1 | 2/2022 | Pudiyapura et al. | | |

(Continued)

OTHER PUBLICATIONS

Gupta, Pankaj, "Algorithms for Routing Lookups and Packet Classification", A dissertation submitted to the department of computer science and the committee on graduate studies of Stanford University in partial fulfillment of the requirements for the degree of doctor of philosophy, Dec. 2000, 223 pgs.

(Continued)

*Primary Examiner* — Xuan Lu

(57) ABSTRACT

Interval binary tree definitions and binary tree definitions can be stored in the memory of a networking device. The interval binary trees can map IP address ranges and port ranges to class identifiers. A networking device receives an IP packet that has a layer 3 header that includes an IP address and a port number. The networking device can use the IP address, the port number, and the interval binary trees to determine a first class identifier and a second class identifier. The first class identifier can indicate a binary tree definition that is searched for the second class identifier. The search identifies yet another class identifier that the networking device uses to determine a networking rule to apply to the IP packet. This technique uses far less memory than the RFC algorithm commonly used to determine a networking rule to apply to the IP packet.

20 Claims, 24 Drawing Sheets

(56) References Cited

U.S. PATENT DOCUMENTS

| | | | |
|---|---|---|---|
| 2003/0123459 A1* | 7/2003 | Liao | H04L 9/40 |
| | | | 370/389 |
| 2017/0222937 A1* | 8/2017 | Lin | H04L 45/7452 |
| 2017/0244642 A1* | 8/2017 | Katebi | H04L 45/54 |
| 2018/0062998 A1* | 3/2018 | Johnson | H04L 12/44 |
| 2019/0068548 A1* | 2/2019 | Lyer | H04L 61/2564 |
| 2021/0263744 A1* | 8/2021 | Crupnicoff | G06F 9/382 |
| 2021/0336883 A1* | 10/2021 | Pudiyapura | H04L 45/748 |
| 2024/0015102 A1* | 1/2024 | Soffer | H04L 45/48 |

OTHER PUBLICATIONS

Gon, Xiang-Yang et al. "ERFC: An Enhanced Recursive Flow Classi—cation Algorithm", Journal of Computer Science and Technology, vol. 25 Issue 5, Sep. 2010, pp. 958-969.
De, Pradipta, "Data Path Processing in Fast Programmable Routers", Nov. 18, 2004, 24 pgs.

* cited by examiner

Table Data
Key Data

Start Address

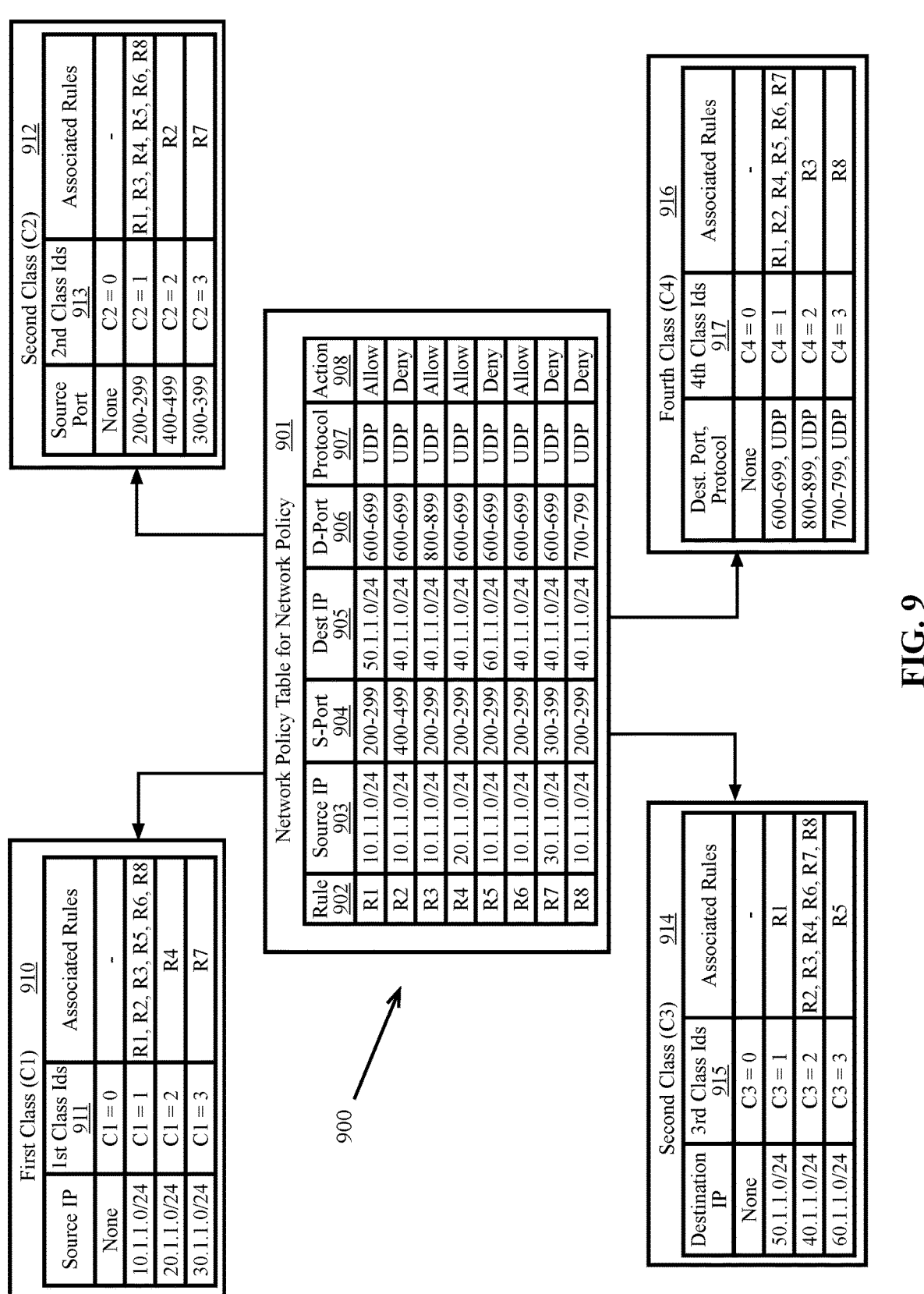

First Class (C1) 910

| Source IP | 1st Class Ids 911 | Associated Rules |
|---|---|---|
| None | C1 = 0 | - |
| 10.1.1.0/24 | C1 = 1 | R1, R2, R3, R5, R6, R8 |
| 20.1.1.0/24 | C1 = 2 | R4 |
| 30.1.1.0/24 | C1 = 3 | R7 |

Second Class (C2) 912

| Source Port | 2nd Class Ids 913 | Associated Rules |
|---|---|---|
| None | C2 = 0 | - |
| 200-299 | C2 = 1 | R1, R3, R4, R5, R6, R8 |
| 400-499 | C2 = 2 | R2 |
| 300-399 | C2 = 3 | R7 |

Second Class (C3) 914

| Destination IP | 3rd Class Ids 915 | Associated Rules |
|---|---|---|
| None | C3 = 0 | - |
| 50.1.1.0/24 | C3 = 1 | R1 |
| 40.1.1.0/24 | C3 = 2 | R2, R3, R4, R6, R7, R8 |
| 60.1.1.0/24 | C3 = 3 | R5 |

Fourth Class (C4) 916

| Dest. Port, Protocol | 4th Class Ids 917 | Associated Rules |
|---|---|---|
| None | C4 = 0 | - |
| 600-699, UDP | C4 = 1 | R1, R2, R4, R5, R6, R7 |
| 800-899, UDP | C4 = 2 | R3 |
| 700-799, UDP | C4 = 3 | R8 |

Network Policy Table for Network Policy 901

| Rule 902 | Source IP 903 | S-Port 904 | Dest IP 905 | D-Port 906 | Protocol 907 | Action 908 |
|---|---|---|---|---|---|---|
| R1 | 10.1.1.0/24 | 200-299 | 50.1.1.0/24 | 600-699 | UDP | Allow |
| R2 | 10.1.1.0/24 | 400-499 | 40.1.1.0/24 | 600-699 | UDP | Deny |
| R3 | 10.1.1.0/24 | 200-299 | 40.1.1.0/24 | 800-899 | UDP | Allow |
| R4 | 20.1.1.0/24 | 200-299 | 40.1.1.0/24 | 600-699 | UDP | Allow |
| R5 | 10.1.1.0/24 | 200-299 | 60.1.1.0/24 | 600-699 | UDP | Deny |
| R6 | 10.1.1.0/24 | 200-299 | 40.1.1.0/24 | 600-699 | UDP | Allow |
| R7 | 30.1.1.0/24 | 300-399 | 40.1.1.0/24 | 600-699 | UDP | Deny |
| R8 | 10.1.1.0/24 | 200-299 | 40.1.1.0/24 | 700-799 | UDP | Deny |

Intersection Table for Sixth Class (C6)   1003

| 3rd & 4th Class Ids | 5th Class Ids 1004 | Associated Rules |
|---|---|---|
| C3,C4 = 0,x | C6 = 0 | - |
| C3,C4 = x,0 | C6 = 0 | - |
| C3,C4 = 1,1 | C6 = 1 | R1 |
| C3,C4 = 1,2 | C6 = 0 | - |
| C3,C4 = 1,3 | C6 = 0 | - |
| C3,C4 = 2,1 | C6 = 2 | R2, R4, R6, R7 |
| C3,C4 = 2,2 | C6 = 3 | R3 |
| C3,C4 = 2,3 | C6 = 4 | R8 |
| C3,C4 = 3,1 | C6 = 5 | R5 |
| C3,C4 = 3,2 | C6 = 0 | - |
| C3,C4 = 3,3 | C6 = 0 | - |

Intersection Table for Final Mapping   1005

| 5th & 6th Class Ids | Associated Rule |
|---|---|
| C5,C6 = 0,x | - |
| C5,C6 = x,0 | - |
| C5,C6 = 1,1 | R1=Allow |
| C5,C6 = 1,2 | R6=Allow |
| C5,C6 = 1,3 | R3=Allow |
| C5,C6 = 1,4 | R8=Deny |
| C5,C6 = 1,5 | R5=Deny |
| C5,C6 = 2,1 | - |
| C5,C6 = 2,2 | R2=Deny |
| C5,C6 = 2,3 | - |
| C5,C6 = 2,4 | - |
| C5,C6 = 2,5 | - |
| C5,C6 = 3,1 | - |
| C5,C6 = 3,2 | R4=Allow |
| C5,C6 = 3,3 | - |
| C5,C6 = 3,4 | - |
| C5,C6 = 3,5 | - |
| C5,C6 = 4,1 | - |
| C5,C6 = 4,2 | R7=Deny |
| C5,C6 = 4,3 | - |
| C5,C6 = 4,4 | - |
| C5,C6 = 4,5 | - |

Intersection Table for Fifth Class (C5)   1001

| 1st & 2nd Class Ids | 5th Class Ids 1002 | Associated Rules |
|---|---|---|
| C1,C2 = 0,x | C5 = 0 | - |
| C1,C2 = x,0 | C5 = 0 | - |
| C1,C2 = 1,1 | C5 = 1 | R1, R3, R5, R6, R8 |
| C1,C2 = 1,2 | C5 = 2 | R2 |
| C1,C2 = 1,3 | C5 = 0 | - |
| C1,C2 = 2,1 | C5 = 3 | R4 |
| C1,C2 = 2,2 | C5 = 0 | - |
| C1,C2 = 2,3 | C5 = 0 | - |
| C1,C2 = 3,1 | C5 = 0 | - |
| C1,C2 = 3,2 | C5 = 0 | - |
| C1,C2 = 3,3 | C5 = 4 | R7 |

FIG. 10

| Class Ids | Memory Location | Stored Value |
|-----------|-----------------|--------------|
| 0,0 | 0xN+0=0 | Value |
| 0,1 | 0xN+1=1 | Value |
| ⋮ | ⋮ | ⋮ |
| 0,N-1 | 0xN+N-1=N-1 | Value |
| 1,0 | 1xN+0=N | Value |
| 1,1 | 1xN+1=N+1 | Value |
| ⋮ | ⋮ | ⋮ |
| 1,N-1 | 1xN+N-1=2N-1 | Value |
| 2,0 | 2xN+0=2N | Value |
| ⋮ | ⋮ | ⋮ |
| N-1,N-1 | (N-1)xN+N-1=NxN-1 | Value |

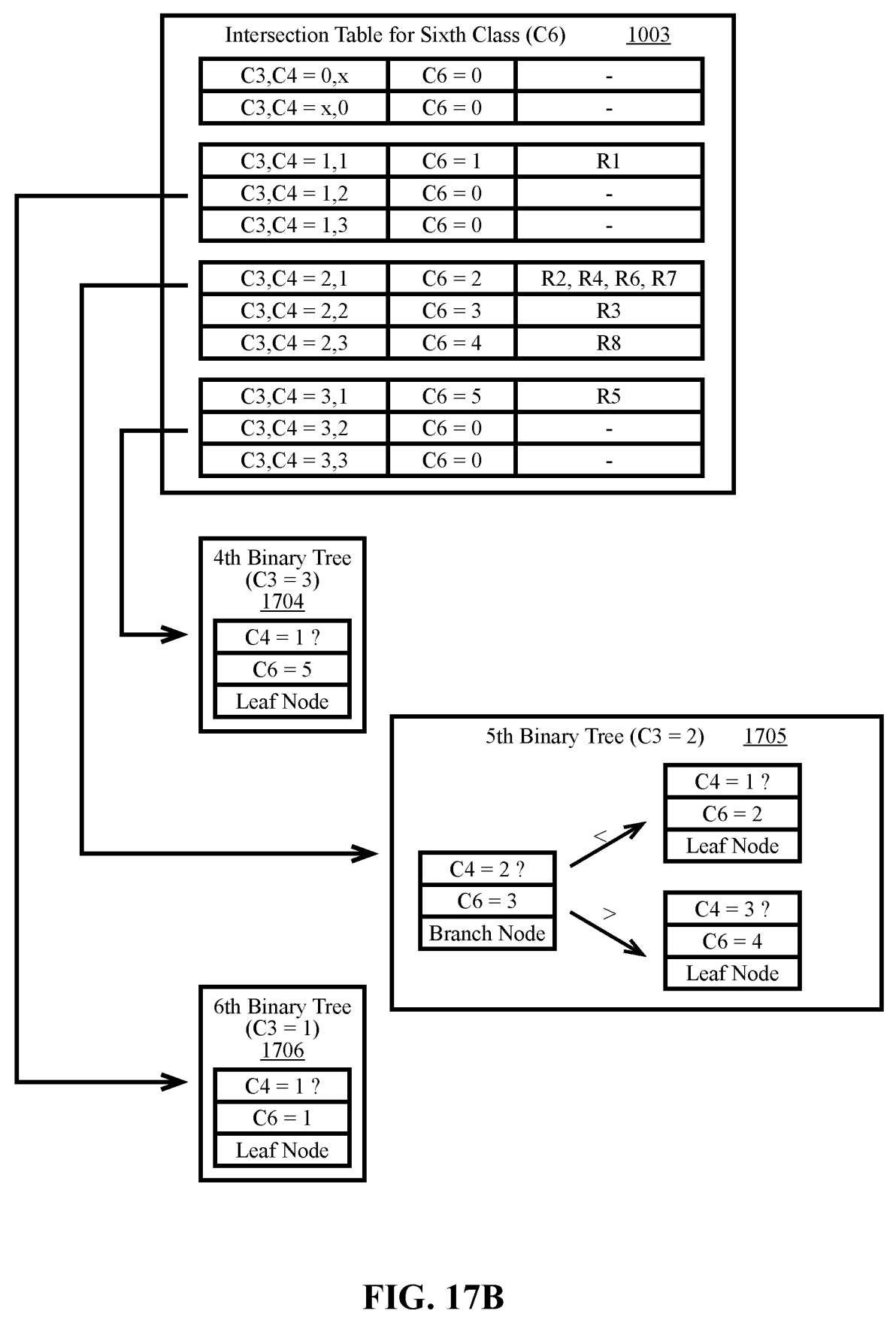

Intersection Table for Sixth Class (C6)    1003

| C3,C4 = 0,x | C6 = 0 | - |
|---|---|---|
| C3,C4 = x,0 | C6 = 0 | - |

| C3,C4 = 1,1 | C6 = 1 | R1 |
|---|---|---|
| C3,C4 = 1,2 | C6 = 0 | - |
| C3,C4 = 1,3 | C6 = 0 | - |

| C3,C4 = 2,1 | C6 = 2 | R2, R4, R6, R7 |
|---|---|---|
| C3,C4 = 2,2 | C6 = 3 | R3 |
| C3,C4 = 2,3 | C6 = 4 | R8 |

| C3,C4 = 3,1 | C6 = 5 | R5 |
|---|---|---|
| C3,C4 = 3,2 | C6 = 0 | - |
| C3,C4 = 3,3 | C6 = 0 | - |

4th Binary Tree (C3 = 3) 1704

| C4 = 1 ? |
|---|
| C6 = 5 |
| Leaf Node |

5th Binary Tree (C3 = 2)    1705

| C4 = 2 ? |
|---|
| C6 = 3 |
| Branch Node |

<

| C4 = 1 ? |
|---|
| C6 = 2 |
| Leaf Node |

>

| C4 = 3 ? |
|---|
| C6 = 4 |
| Leaf Node |

6th Binary Tree (C3 = 1) 1706

| C4 = 1 ? |
|---|
| C6 = 1 |
| Leaf Node |

FIG. 17B

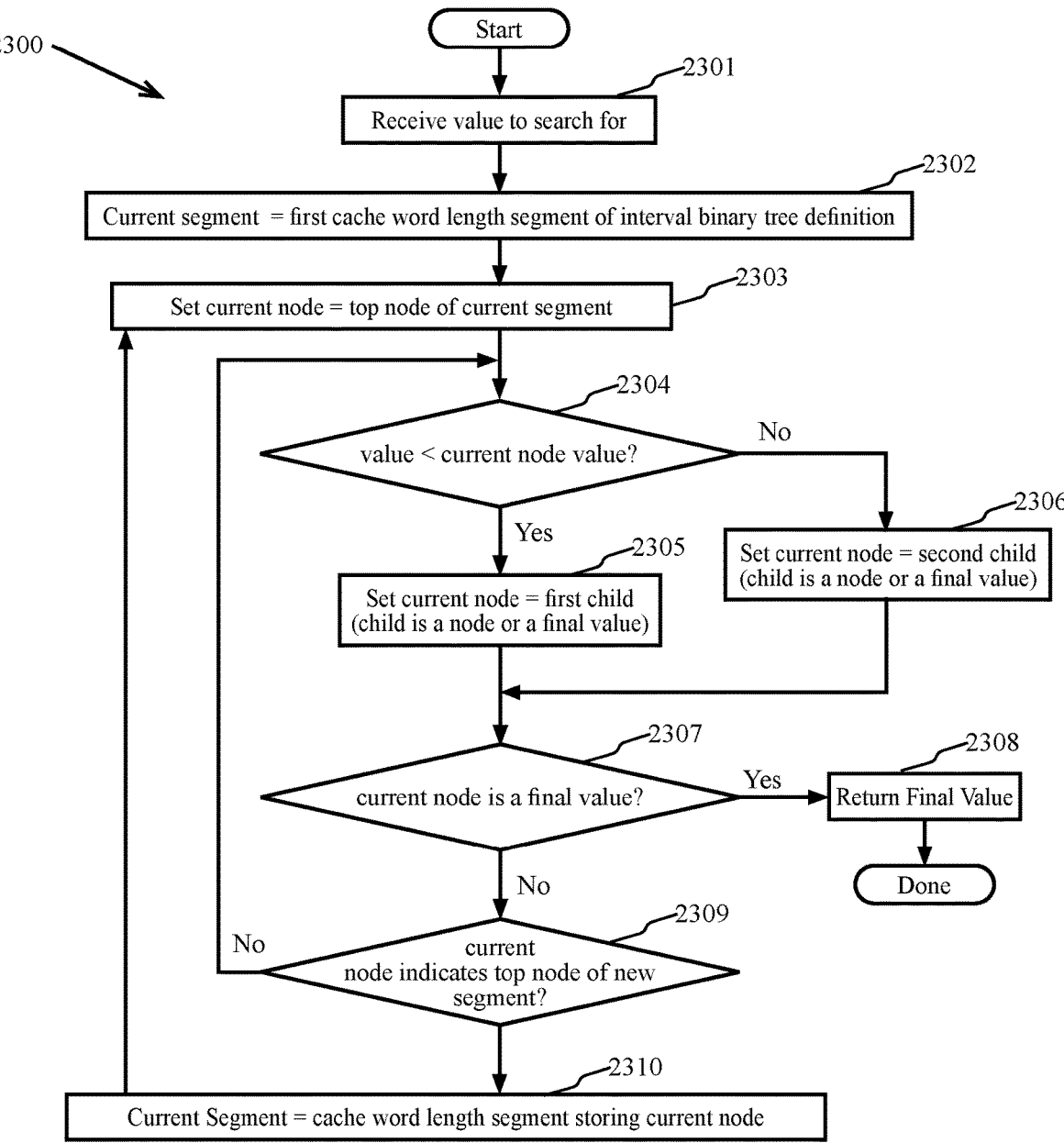

2300

Start

2301
Receive value to search for

2302
Current segment = first cache word length segment of interval binary tree definition 2303
Set current node = top node of current segment 2304
value < current node value?

No

Yes

2306
Set current node = second child
(child is a node or a final value)

2305
Set current node = first child
(child is a node or a final value)

2307
current node is a final value?

Yes

2308
Return Final Value

Done

No 2309
current
node indicates top node of new
segment?

No

2310
Current Segment = cache word length segment storing current node

FIG. 23

SYSTEMS AND METHODS FOR OPTIMIZING A PACKET CLASSIFICATION ALGORITHM FOR IMPLEMENTATION BY A PACKET PROCESSING PIPELINE

TECHNICAL FIELD

The embodiments relate to computer networks, local area networks, networking devices such as a router, a switch, a network interface card (NIC), a smartNIC, and a distributed service card (DSC). The embodiments also relate to elements of networking devices such as semiconductor chips implementing packet processing pipeline circuits, match-action pipelines, and to using match-action pipelines for searching interval binary trees.

BACKGROUND

Networking devices process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a networking device. The P4 domain-specific language for programming the data plane of networking devices has been defined in the "P4$_{16}$ Language Specification," version 1.2.2, as published by the P4 Language Consortium on May 17, 2021. P4 (also referred to herein as the "P4 specification," " the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits can be considered to be central processing unit (CPU) offloads because they offload work from the CPUs and thereby free the CPUs to perform other tasks. Cryptographic transform circuits, compression circuits, and decompression circuits, are also examples of CPU offloads.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a system. The system can include an ingress port that receives an internet protocol (IP) packet that includes a first IP packet header field value in a first IP packet header field and a second IP packet header field value in a second IP packet header field, a memory storing a first interval binary tree definition for a first interval binary tree, and a plurality of binary tree definitions for a plurality of binary trees, and at least one processor. The processor can be configured to determine a first class identifier by searching the first interval binary tree for the first IP packet header field value, utilize the second IP packet header field value to determine a second class identifier, utilize the first class identifier to locate a one of the binary tree definitions for a one of the binary trees, determine a third class identifier by searching for the second class identifier in the one of the binary trees, and utilize the third class identifier to identify a networking rule or a networking rule outcome for the IP packet.

Another aspect of the subject matter described in this disclosure can be implemented by a system. The system can include an ingress port that receives an internet protocol (IP) packet that includes a source IP address and a source port indicator, a memory storing a first interval binary tree definition for a first interval binary tree, a second interval binary tree definition for a second interval binary tree, and a plurality of binary tree definitions for a plurality of binary trees, and at least one processor. The processor can be configured to determine a first class identifier by searching the first interval binary tree for the source IP address, determine a second class identifier by searching the second interval binary tree for the source port indicator, utilize the first class identifier to locate a one of the binary tree definitions for a one of the binary trees, and determine a third class identifier by searching for the second class identifier in the one of the binary trees, and utilize the third class identifier to identify a networking rule or a networking rule outcome for the IP packet.

Yet another aspect of the subject matter described in this disclosure can be implemented by a method. The method can include receiving an IP packet that includes a first IP packet header field value in a first IP packet header field and a second IP packet header field value in a second IP packet header field, determining a first class identifier by searching a first interval binary tree for the first IP packet header field value, using the second IP packet header field value to determine a second class identifier, using the first class identifier to locate a binary tree definition for a binary tree, determining a third class identifier by searching for the second class identifier in the binary tree, and using the third class identifier to identify a networking rule or a networking rule outcome for the IP packet.

In some implementations of the methods and devices, the memory stores a second interval binary tree definition for a second interval binary tree, and the second class identifier is determined by searching the second interval binary tree for the second IP packet header field value. In some implementations of the methods and devices, the IP packet further includes a third IP packet header field value in a third IP packet header field and a fourth IP packet header field value in a fourth IP packet header field, a third interval binary tree and the third IP packet header field value are used to determine a fourth class identifier, a fourth interval binary tree and the fourth IP packet header field value are used to determine a fifth class identifier, the fourth class identifier indicates a second one of the binary tree definitions, the fifth class identifier and the second one of the binary tree definitions are used to determine a sixth class identifier, and the third class identifier and the sixth class identifier are used to identify the networking rule or the networking rule outcome for the IP packet. In some implementations of the methods and devices, the third class identifier indicates a third one of the binary tree definitions, and the sixth class identifier and the third one of the binary tree definitions are used to identify the networking rule or the networking rule outcome for the IP packet. In some implementations of the methods and devices, the sixth class identifier indicates a third one of the binary tree definitions, and the third class identifier and the third one of the binary tree definitions are used to identify the networking rule or the networking rule outcome for the IP packet. In some implementations of the methods and devices, the IP packet further includes a fifth IP packet header field value in a fifth IP packet header field, the fifth IP packet header field value is a protocol indicator, the fourth IP packet header field value indicates a destination port, and the fourth interval binary tree, the fourth IP packet header field value, and the protocol indicator are used to determine the fifth class identifier. In some implementations of the methods and devices, the third IP packet header field indicates a destination IP address.

In some implementations of the methods and devices, the first IP packet header field indicates a source IP address, and the second IP packet header field indicates a destination IP address. In some implementations of the methods and devices, the networking rule is one of N networking rules of a networking policy, and an amount of the memory required to store the first interval binary tree for the networking policy scales at worst linearly with N. In some implementations of the methods and devices, the first class identifier indicates a memory location where the one of the binary trees is stored. In some implementations of the methods and devices, the networking rule is one of N networking rules of a networking policy, a maximum first field overlaps value is set for the networking policy, and no more than the maximum first field overlaps value of the first packet header field are allowed in the networking policy. In some implementations of the methods and devices, the memory includes a plurality of pre-allocated blocks storing the binary tree definitions, the first class identifier indicates a one of the pre-allocated blocks, and the one of the pre-allocated blocks stores all of the one of the binary tree definitions. In some implementations of the methods and devices, the memory includes a plurality of pre-allocated blocks storing the first interval binary tree definition, a cache word length segment of one of the pre-allocated blocks includes a portion the first interval binary tree definition, the at least one processor includes a match-action stage of a match-action pipeline circuit, the match-action stage reads the cache word length segment, and the match-action stage uses the portion of the first interval binary tree definition to perform a part of an interval binary tree search for the first IP packet header field value.

In some implementations of the methods and devices, a second cache word length segment of the one of the pre-allocated blocks includes a second portion of the first interval binary tree definition, the at least one processor includes a second match-action stage of the match-action pipeline circuit, the second match-action stage reads the second cache word length segment, and the second match-action stage uses the second portion to perform a second part of the interval binary tree search. In some implementations of the methods and devices, the memory stores a networking policy table that includes N networking rules, the networking policy table is used to produce an interval table that associates a plurality of IP address ranges with a plurality of first class identifiers that includes the first class identifier, and the interval table is used to produce the first interval binary tree definition.

In some implementations of the methods and devices, the IP packet further includes a destination IP address and a destination port indicator, a third interval binary tree and the destination IP address are used to determine a fourth class identifier, a fourth interval binary tree and the destination port indicator are used to determine a fifth class identifier, the fourth class identifier indicates a second one of the binary tree definitions, the fifth class identifier and the second one of the binary tree definitions are used to determine a sixth class identifier, and the third class identifier and the sixth class identifier are used to identify the networking rule or the networking rule outcome for the IP packet.

In some implementations of the methods and devices, the second class identifier is determined by searching a second interval binary tree for the second IP packet header field value. In some implementations of the methods and devices, the IP packet further includes a third IP packet header field value in a third IP packet header field and a fourth IP packet header field value in a fourth IP packet header field, a third interval binary tree and the third IP packet header field value are used to determine a fourth class identifier, a fourth interval binary tree and the fourth IP packet header field value are used to determine a fifth class identifier, the fourth class identifier indicates a second binary tree definition, the fifth class identifier and the second binary tree definition are used to determine a sixth class identifier, and the third class identifier and the sixth class identifier are used to identify the networking rule or the networking rule outcome for the IP packet.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 9 illustrates a networking policy table for a networking policy according to some aspects.

FIG. 10 illustrates intersection tables that can be used for determining rules from class identifiers according to some aspects.

FIG. 17A, FIG. 17B, and FIG. 17C are high level conceptual diagrams that illustrate using binary trees to identify class Ids, network rules, and network outcomes according to some aspects.

FIG. 23 is a high-level flow diagram that illustrates a process performing an interval binary tree search according to some aspects.

Throughout the description, similar reference numbers may be used to identify similar elements.

DETAILED DESCRIPTION

Figure 1:
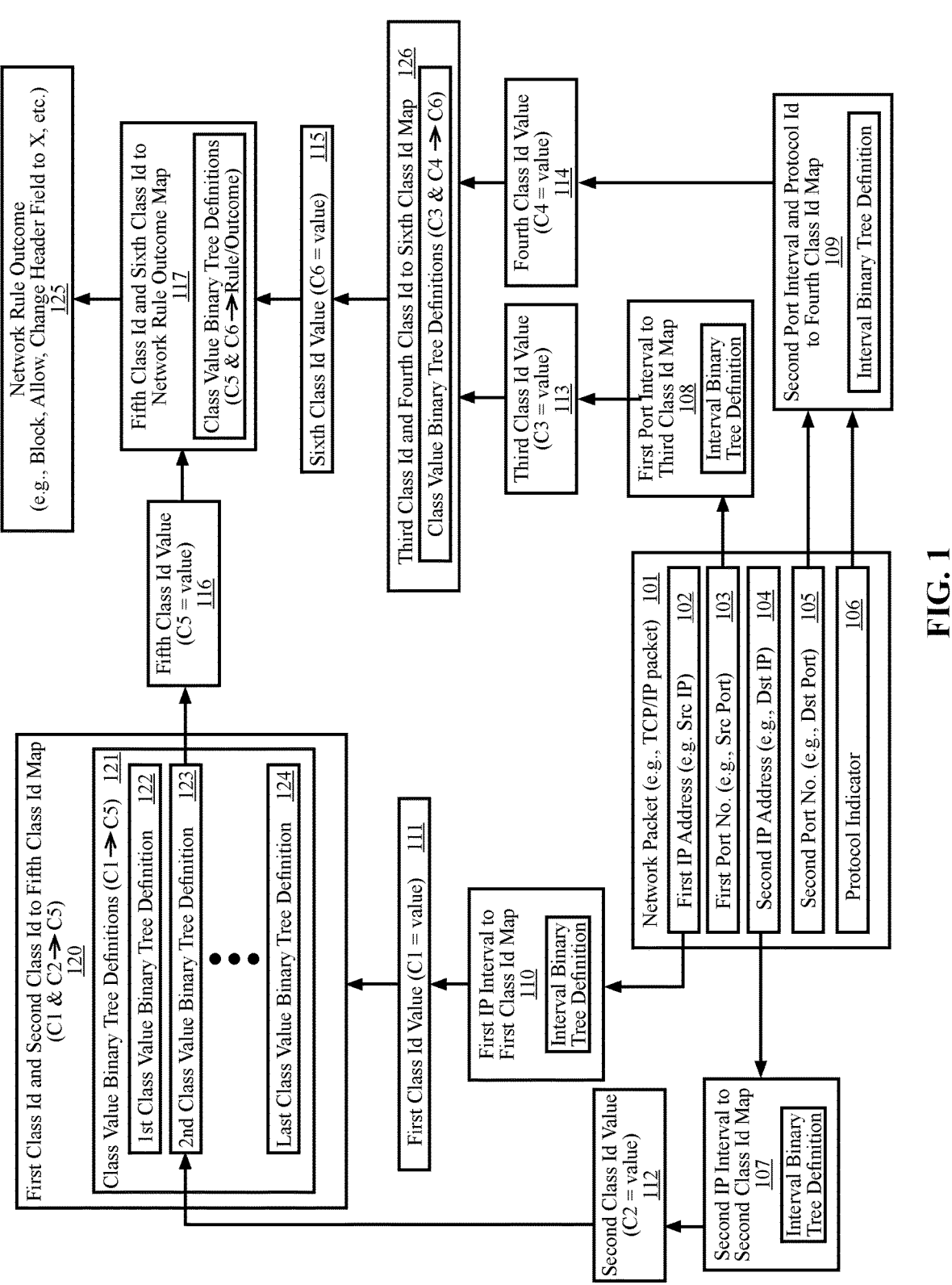
FIG. 1 is a high-level conceptual diagram of determining which network rule is to be applied to an internet protocol (IP) packet according to some aspects.

It will be readily understood that the components of the embodiments as generally described herein and illustrated in the appended figures could be arranged and designed in a wide variety of different configurations. Thus, the following more detailed description of various examples, as represented in the figures, is not intended to limit the scope of the present disclosure, but is merely representative of various embodiments. While the various aspects of the embodiments are presented in drawings, the drawings are not necessarily drawn to scale unless specifically indicated.

Systems and methods that implement aspects of the embodiments may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one embodiment. Thus, discussions of the features and advantages, and similar language, throughout this specification may, but do not necessarily, refer to the same embodiment.

Furthermore, the described features, advantages, characteristics, and aspects may be combined in any suitable manner in one or more systems or methods. One skilled in the relevant art will recognize, in light of the description herein, that an embodiment can be practiced without one or more of the specific features or advantages of another embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

In the field of data networking, the functionality of networking devices such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. A match-action pipeline has a series of match-action stages. Upon receiving a packet of a network traffic flow, the first match-action stage of a match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action stage can perform a default action. Match-action stages may pass the packet to a subsequent match-action stage in the match-action pipeline.

The high-volume and rapid decision-making that occurs at the data plane is often implemented in one or more semiconductor chips. An application specific integrated circuit (ASIC) and a field programmable gate array (FPGA) are examples of such semiconductor chips. A semiconductor chip such as a fixed function ASIC may enable high-volume and rapid packet processing. However, a fixed function ASIC typically does not provide enough flexibility to adapt to changing needs. Data plane processing implemented in FPGAs may provide a high level of flexibility in data plane processing.

Internet protocol (IP) packets are network packets that carry much of the data that is transmitted on computer networks. The payloads of IP packets are usually packets of a higher layer protocol such as transmission control protocol (TCP) or user datagram protocol (UDP). A TCP/IP packet is a TCP packet encapsulated by an IP packet. A UDP/IP packet is a UDP packet encapsulated by an IP packet. TCP/IP packets and UDP/IP packets have header fields that carry what is often called a 5-tuple. An IP packet's 5-tuple is the source address, the source port, the destination address, the destination port, and the protocol indicator in the packet's header fields. In order to be communicated from one computer to another, network packets often transit a large number of networking devices. A networking device can be configured with network policies that instruct the networking device regarding how to process each network packet.

Firewall rules, routing rules, network address translation (NAT) rules, shaping rules, policing rules, accounting/billing rules, and metering rules are examples of network policies. Network policies are typically specified by network policy tables that include a large number of network rules. A networking device such as a switch, router, network interface card (NIC), SmartNIC, etc. can process a network packet by determining which of the network rules apply to the packet and then applying that rule. The rules to apply can be determined by searching the policy tables. Searching the policy tables is time consuming and specialized algorithms, data structures, and hardware have been developed such that some networking devices can process tens of millions of network packets per second. The recursive flow classification (RFC) algorithm is often used to determine what rule is to be applied to a packet.

RFC has been a cornerstone of networking but is running into scaling issues because RFC requires data tables (e.g., the RFC intersection tables) that must be stored in memory and the memory footprint of those data tables scales as the square of the number of rules in the policy table. Analysis of current hardware needs has shown that nearly two megabytes are required by RFC for a network policy that has 1K rules (one thousand rules), about 33 megabytes are required by RFC for a network policy that has 4K rules, and about 490 megabytes are required by RFC for a network policy that has 16K rules. The scale of network operations has been growing at a rapid pace and network device users currently want to implement policies with 16K rules and even more rules if possible. Furthermore, each network device implements numerous network policies. Finally, networking devices often keep half of their memory reserved in order to guarantee hitless upgrade capabilities. The memory being considered here is fast volatile memory such as double data rate 5 (DDR5) synchronous dynamic random-access memory (SDRAM). The amount of memory required by the networking devices is therefore expected to be huge and perhaps prohibitive.

The required memory footprint can be reduced by using interval binary trees and binary trees to determine the network rule to apply to a packet. Analysis of the structure of interval binary trees and binary trees indicates that the maximum amount of memory required for storing a binary tree for locating a networking rule/outcome or class identifier can be proportional to maxOverlaps*N where N is the number of rules in the policy. Here, maxOverlaps is a parameter indicating either the maximum number of overlaps that is possible for a packet header field or the maximum number of overlaps that are allowed in an implementation or a deployment. In other words, for a networking policy with N rules, the maximum amount of memory that is required for storing the binary tree definitions for the networking policy scales linearly with N. Testing and modeling has shown that a memory allocation of 180 MB is sufficient to ensure enough memory for storing a networking policy that has 256K rules. Implementing a 256K rule networking rule using the RFC algorithm is practically, perhaps physically, impossible. These figures assume that maxOverlap is 32.

The RFC algorithm uses a set of intersection tables to identify a networking rule or outcome based on a set of class indicators. The memory required for storing the RFC intersection tables scales as $N^2$. Here, binary trees are used instead, greatly reducing the required amount of memory for performing intersections. A further advantage is that some networking devices use match-action pipelines that process network packets using a series of processing stages that perform pipelined operations.

The interval binary trees for networking policies can be produced using regular computing hardware because producing the tree is not as time critical as searching the tree. Certain networking devices have packet processing pipeline circuits that include match-action processing stages that are arranged as a match-action pipeline because the second processing stage processes the result produced by the first processing stage, the third processing stage processes the result produced by the second processing stage, and so forth until the last processing stage produces a result. Each processing stage can begin and complete its processing tasks within a specified number of clock cycles such that results are produced and flow through the pipeline at a rate governed by that specified number of clock cycles. Such processing tasks include reading a cache line sized block of data from memory, and using that data to perform a portion of an interval binary tree search or binary search. The subsequent match-action stage can perform a subsequent portion of the interval binary tree search or the binary search. The processing stages of certain match-action pipelines have been proven to be capable of rapid and efficient execution of interval binary tree searches and binary searches. The intersection of highly capable match-action pipelines with binary search techniques is yielding major advances in the speed and efficiency with which network packets can be processed. As such, the match-action pipeline can perform searches at a rate that is impossible for general purpose central processing unit (CPU) cores. The end result is that a networking device can implement networking policies that were previously impossible to implement in a high-speed networking device.

FIG. 1 is a high-level conceptual diagram of determining which network rule is to be applied to an internet protocol (IP) packet 101 according to some aspects. The IP packet 101 includes a first IP address 102, a first port number 103, a second IP address 104, a second port number 105, and a protocol indicator 106. The first IP address 102 can be the packet's source IP address and the second IP address 104 can be the packet's destination IP address. A first IP interval to first class identifier map 110 can be searched for the first IP address to locate a first class identifier value 111. A second IP interval to second class identifier map 107 can be searched for the second IP address to locate a second class identifier value 112. Here, different IP address ranges have been associated with different class identifiers. An interval map, such as the first IP interval to first class identifier map and the second IP interval to second class identifier map 107, maps input values to output values. The first IP interval to first class identifier map 110 maps values of the first IP address to values of the first class identifier, denoted as C1. The first class identifier value 111 identifies the class value associated with an IP address range that includes the first IP address 102. The first class identifier value can be associated with all the networking rules that may apply to the first IP address. The second IP interval to second class identifier map 107 maps values of the second IP address to values of the second class identifier, denoted as C2. The second class identifier value 112 identifies the class value associated with an IP address range that includes the second IP address 104. The second class identifier value can be associated with all the networking rules that may apply to the second IP address. A zero value for the first class Id value or the second class Id value can indicate that there are no applicable rules. A fail or search failure is indicated by the zero value. The search for a rule can be stopped as soon as a class Id of zero is found.

The first class ID and second class Id to fifth class Id map 120 includes class Id binary tree definitions 121 such as the first class value binary tree definition 122, the second class value binary tree definition 123, and the last class value binary tree definition 124. The fifth class is denoted as C5. The first class Id value 111 can select one of the class value binary tree definitions. That one of the class value binary tree definitions then be searched for the second class Id value 112. The result of the search is the fifth class Id value 116. As discussed above, the value of C1 can be associated with the networking rules associated with the first IP address while the value of C2 can be associated with the networking rules associated with the second IP address. C5 is the intersection of C1 and C2. More precisely, the value of C5 can be associated with the networking rules that are associated with both the first IP address and the second IP address.

A first port number to third class identifier map 108 can be used to determine a third class identifier 113 for the first port number. The third class identifier can be associated with all the networking rules that may apply to the first port number. A second port number and protocol indicator to fourth class identifier map 109 can be used to determine a fourth class identifier 114 for the second port number and the protocol indicator. The second port number and the protocol indicator are often combined because the networking rules often have the same few protocol indicators for the destination port numbers. The fourth class identifier can be associated with all the networking rules that may apply to both the second port number 105 and the protocol indicator 106. The third class identifier 113 and the fourth class identifier 114 can be mapped to a sixth class identifier 115 by a third class identifier and fourth class identifier to sixth class identifier map 126. Conceptually, the sixth class identifier is the intersection of the set of rules that may apply to the first port number 103, the set of rules that may apply to the second port number 105, and the set of rules that may apply to the protocol indicator 106. The fifth class identifier 116 and the sixth class identifier 115 can be mapped to a network rule or a network rule outcome 125 by a fifth class identifier and sixth class identifier to network rule outcome map 117.

Conceptually, there is only one network rule that is in the intersection of the set of rules that may apply to the first IP address 102, the set of rules that may apply to the second IP address 104, the set of rules that may apply to the first port number 103, the set of rules that may apply to the second port number 105, and the set of rules that may apply to the protocol indicator 106. That single network rule has an outcome or action such as "allow", "drop", "raise alert", initiate tenant billing action", "tenant policing action", "NAT map action", etc. Determining a network rule for a packet should be interpreted equivalently to determining a network rule outcome because those practiced in the art often commingle the concepts. For example, the desired result of searching for a rule is to determine the outcome for the rule. As such, a search for a networking rule in a networking policy table usually results in determining the network rule outcome (e.g., "allow") instead of the network-ing rule itself (e.g., R1, R2, etc.).

Figure 2:
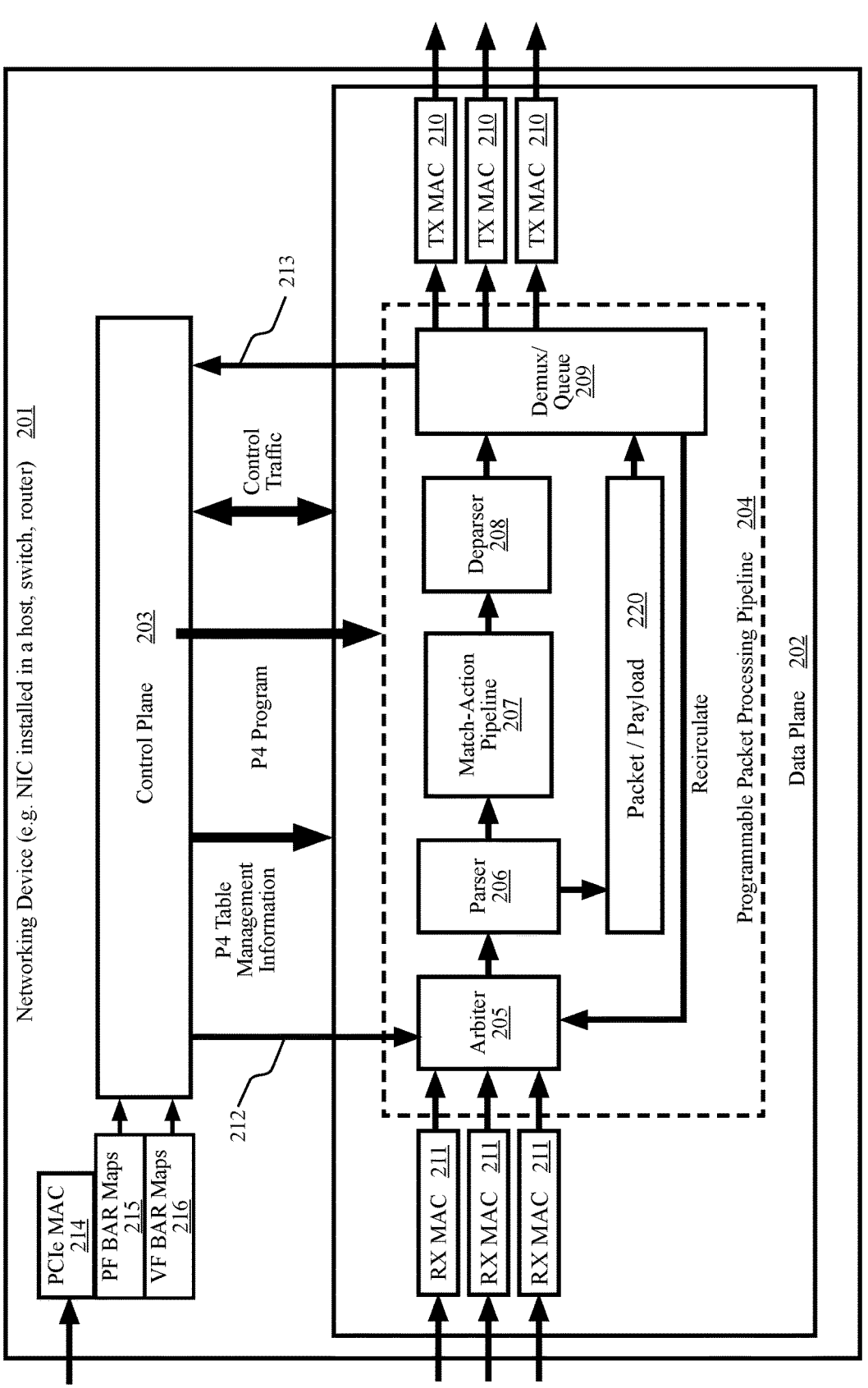
FIG. 2 is a functional block diagram of a networking device having a control plane and a data plane and in which aspects may be implemented.

FIG. 2 is a functional block diagram of a networking device having a control plane and a data plane and in which aspects may be implemented. A networking device 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive opera-tions such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter man-agement functions, Open Shortest Path First (OSPF), Enhanced Interior Gateway Routing Protocol (EIGRP), Bor-der Gateway Protocol (BGP), Intermediate System to Inter-mediate System (IS-IS), Label Distribution Protocol (LDP), routing tables and/or operations related to packet switching that include Address Resolution Protocol (ARP) and Span-ning Tree Protocol (STP). The data plane (which may also be referred to as the "forwarding" plane) may implement operations related to parsing packet headers, Quality of Service (QOS), filtering, encapsulation, queuing, and polic-ing. Although some functions of the control plane and data plane are described, other functions may be implemented in the control plane and/or the data plane.

Some techniques exist for providing flexibility at the data plane of networking devices that are used in data networks. For example, the concept of a domain-specific language for programming protocol-independent packet processors, known simply as "P4," has developed as a way to provide some flexibility at the data plane of a networking device. The document "P4$_{16}$ Language Specification," version 1.2.2, published by the P4 Language Consortium on May 17, 2021, which is incorporated by reference herein, describes the P4 domain-specific language that can be used for programming the data plane of networking devices. P4 (also referred to herein as the "P4 specification," the "P4 language," and the "P4 program") is designed to be implementable on a large variety of targets including switches, routers, programmable NICs, software switches, semiconductor chip, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a layer 2 protocol such as Ethernet. The layer 2 protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output central processing unit (CPU) port 213. The control plane is often referred to as a CPU although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the networking device. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A networking device 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The Infini-Band PF and VFs can be used for data transfers, such as remote direct memory access (RDMA) transfers to other VMs running on the same or other host computers. Simi-larly, a NIC can provide non-volatile memory express (NVMe) and small computer system interface (SCSI) PFs and VFs to VMs running on the host.

Figure 3:
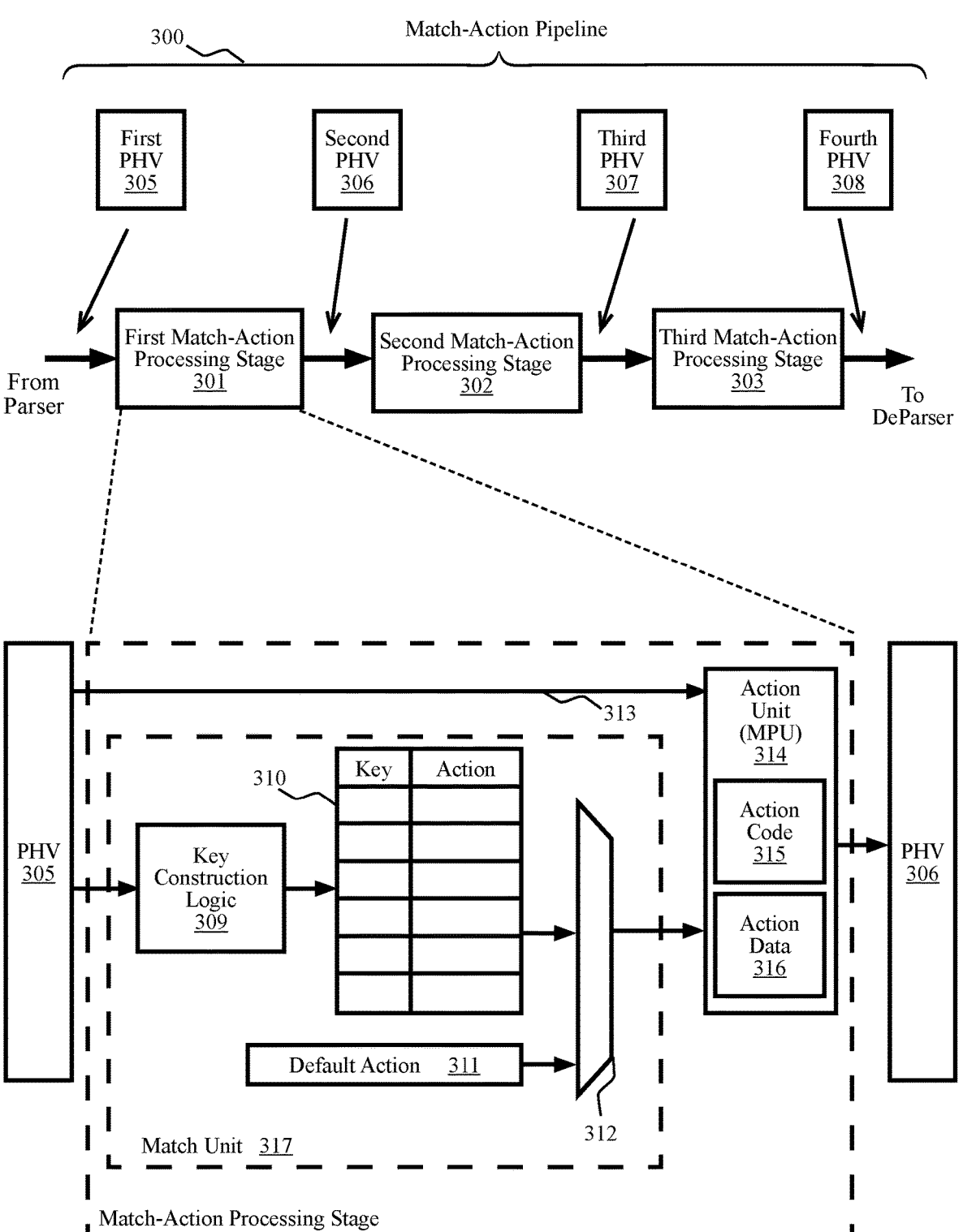
FIG. 3 is a functional block diagram illustrating an example of a match-action processing stage in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often called stages or match-action processing stages, of the packet processing pipeline. The match-action processing stages 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action processing stages in the match-action pipeline in series and each match-action processing stages can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first match-action processing stage 301 receives the first PHV 305 as an input and outputs the second PHV 306. The second match-action processing stage 302 receives the second PHV 306 as an input and outputs the third PHV 307. The third match-action processing stage 303 receives the third PHV 307 as an input and outputs the fourth PHV 308. The match-action process-ing stages are arranged as a match-action pipeline because the PHVs pass from one match-action processing stage to the next match-action processing stage in the pipeline.

An expanded view of elements of a match-action pro-cessing stage 301 of match-action pipeline 300 is shown. The match-action processing stage includes a match unit 317 (also referred to as a "table engine") that operates on an input PHV 305 and an action unit 314 that produces an output PHV 306, which may be a modified version of the input PHV 305. The match unit 317 can include key con-struction logic 309, a lookup table 310, and selector logic 312. The key construction logic 309 is configured to gen-erate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action processing stages can be programmable by the control plane via P4 and the contents of the lookup table can be managed by the control plane.

Figure 4:
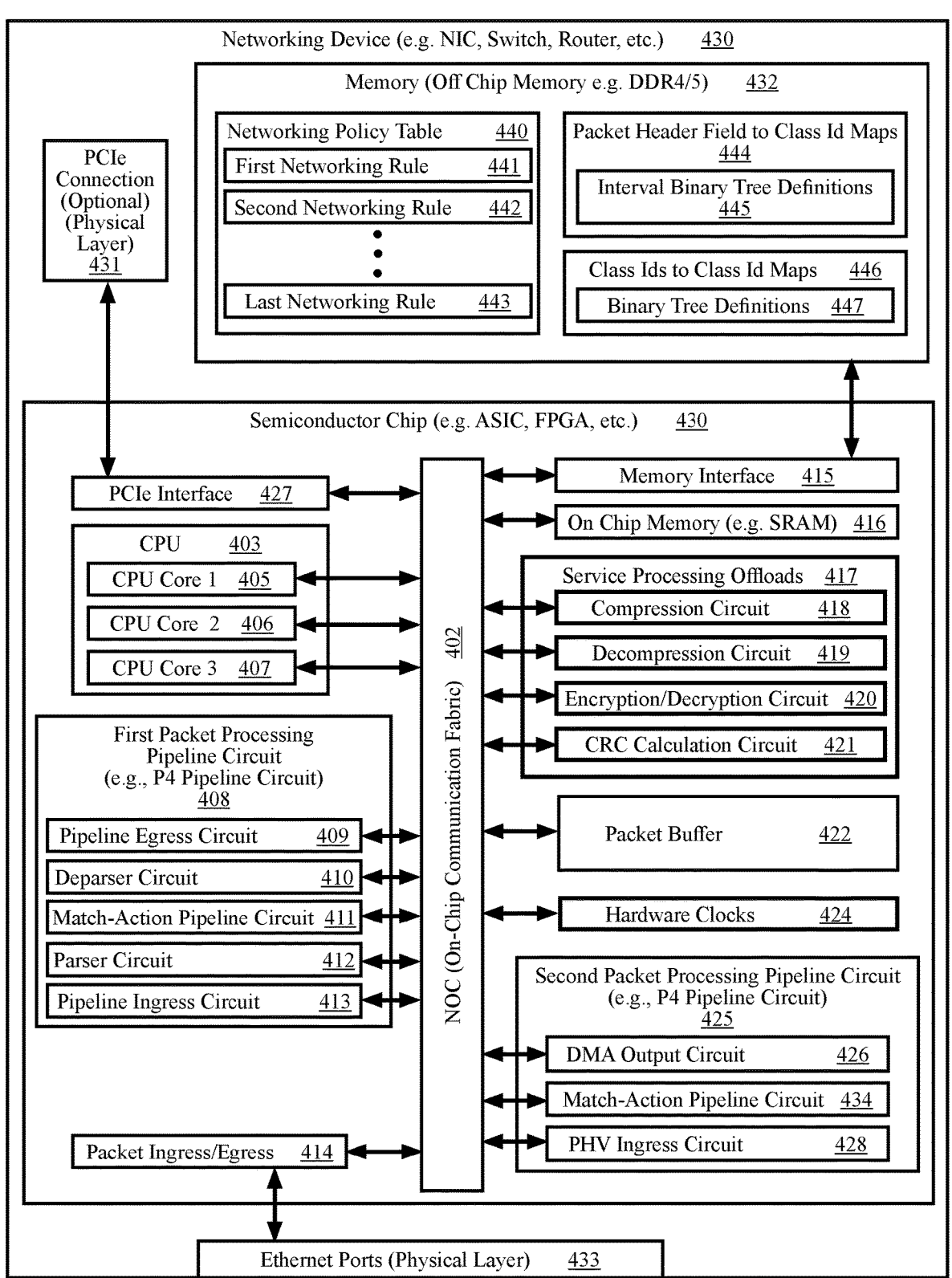
FIG. 4 is a functional block diagram of a networking device having a semiconductor chip such as an application specific integrated circuit (ASIC) or field programmable gate array (FPGA), according to some aspects.

FIG. 4 is a functional block diagram of a networking device 430 having a semiconductor chip 401 such as an ASIC or FPGA, according to some aspects. The semicon-ductor chip 401 shows a single semiconductor chip imple-menting a large number of hardware functions. A different and substantially equivalent implementation may employ a chiplet architecture. If the networking device is a network interface card (NIC) then the NIC can be installed in a host computer and can act as a networking device for the host computer and for virtual machines running on the host computer. Such a NIC can have a PCIe connection 431 for communicating with the host computer via a host PCIe connection. The networking device 430 can have a semi-conductor chip 401, off chip memory 432, and ethernet ports 433. The off-chip memory 432 can be one of the widely available memory modules or chips such as double data rate 5 (DDR5) synchronous dynamic random-access memory (SDRAM) such that the semiconductor chip 401 has access to many gigabytes of memory on the networking device 430. The ethernet ports 433 provide physical connectivity to a computer network such as the internet. The NIC can include a printed circuit board to which the semiconductor chip 401 and the memory 432 are attached.

The semiconductor chip can have many core circuits interconnected by an on-chip communications fabric, some-times called a network on a chip (NOC) 402. NOCs are often implementations of standardized communications fabrics such as the widely used advanced extensible interface (AXI) bus. The semiconductor chip's core circuits can include a PCIe interface 427, CPU 403, first packet processing pipe-line circuit 408, memory interface circuit 415, on chip memory such as static random access memory (SRAM) 416, service processing offloads 417, a packet buffer 422, meter-ing circuit 423, and packet ingress/egress circuits 414. The PCIe interface 427 can be used to communicate with a host computer via the PCIe connection 431. The CPU 403 can include numerous CPU cores such as a first CPU core 405, a second CPU core 406, and a third CPU core 407. The first packet processing pipeline circuit 408 can include a pipeline ingress circuit 413, a parser circuit 412, match-action pipe-line circuit 411, a deparser circuit 410, and a pipeline egress circuit 409. The second packet processing pipeline circuit 425 can include a PHV ingress circuit 428, a match-action pipeline circuit 434, and a direct memory access (DMA) output circuit 426. The service processing offloads 417 are circuits implementing functions that the semiconductor chip uses so often that the designer has chosen to provide hardware for offloading those functions from the CPU. The service processing offloads can include a compression cir-cuit 418, decompression circuit 419, an encryption/decryp-tion circuit 420, and a general use CRC calculation circuit 421. The general use CRC calculation circuit 421 can calculate digest values for data blocks. For example, the general use CRC calculation circuit 421 can calculate Ethernet FCS values. The specific core circuits implemented within the non-limiting example of the semiconductor chip 401 can be selected such that the semiconductor chip implements many, perhaps all, of the functionality of an InfiniBand channel adapter, of an NVMe card, and of a networking device that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The first packet processing pipeline circuit 408 is a specialized set of elements for processing PHVs including PHVs for network packets such as internet protocol (IP) packets and InfiniBand protocol data units (PDUs). The first packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The second packet processing pipeline circuit 425 is a specialized set of elements for processing PHVs including PHVs for network packets such as internet protocol (IP) packets and InfiniBand protocol data units (PDUs). The second packet processing pipeline circuit 425 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The networking device 430 can include a memory 432 for running Linux or some other operating system and for storing data used by the processes implementing network services, upgrading the control plane, and upgrading the data plane. The networking device can use the memory 432 to store a networking policy table 440 and packet header field to class identifier maps 444. In practice, the networking device 430 is implementing numerous networking policies and therefore stores networking policy tables for all the networking policies that are being implemented. A networking policy table 440 includes numerous networking rules such as a first networking rule 441, a second networking rule 442, and a last networking rule 443. The packet header field to class identifier maps 444 can include numerous interval binary tree definitions 445 and class Ids to class Id maps 446 (e.g., first class ID and second class Id to fifth class Id map 120). The class Ids to class Id maps 446 can include binary tree definitions 447.

The CPU cores 405, 406, 407 can be general purpose processor cores, such as ARM processor cores, microprocessor without interlocked pipelined stages (MIPS) processor cores, and/or x86 processor cores, as is known in the field. Each CPU core can include an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 405, 406, 407 available for control plane functions and for implementing aspects of a slow data path that includes software implemented packet processing functions. The CPU cores may be used to implement discrete packet processing operations such as layer 7 applications (e.g., HTTP load balancing, layer 7 firewalling, and/or layer 7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by a packet processing pipeline circuits 408, 425.

The first packet processing pipeline circuit 408 can be a specialized circuit or part of a specialized circuit using one or more semiconductor chips such as ASICs or FPGAs to implement programmable packet processing pipelines such as the programmable packet processing pipeline 204 of FIG. 2. Some embodiments include semiconductor chips such as ASICs or FPGAs implementing a P4 pipeline as a fast data path within the networking device. The fast data path is called the fast data path because it processes packets faster than a slow data path that can also be implemented within the networking device. An example of a slow data path is a software implemented data path wherein the CPU 403 and memory 432 are configured via software to implement a slow data path. A networking device having two data paths has a fast data path and a slow data path when one of the data paths processes packets faster than the other data path.

All data transactions in the semiconductor chip 401, including on-chip memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the first packet processing pipeline circuit 408, the second packet processing pipeline circuit 425, CPU

403, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
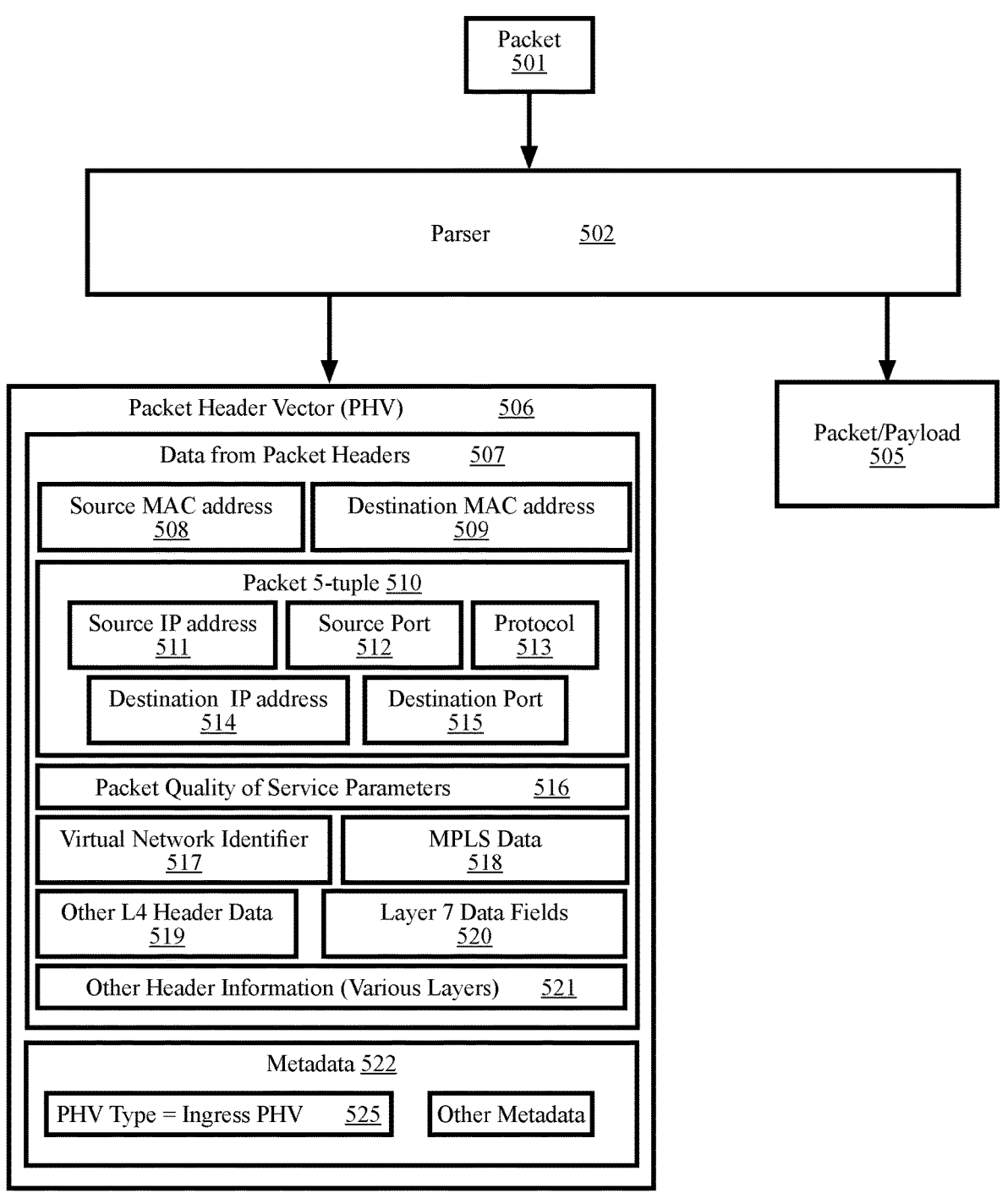
FIG. 5 is a high-level diagram illustrating an example of generating a packet header vector from a packet according to some aspects.

FIG. 5 is a high-level diagram illustrating an example of generating an ingress packet header vector (PHV) 506 from a packet 501 according to some aspects. The PHV 506 is an ingress PHV because it is produced by a parser 502 parsing a packet 501 received via an ingress port as a bit stream. The parser 502 can receive a packet 501 that has layer 2, layer 3, layer 4, and layer 7 headers and payloads. The parser can generate a PHV 506 from packet 501. The packet header vector 506 can include many data fields including data from packet headers 507 and metadata 522. The metadata 522 can include data generated by the networking device such as the hardware port on which the packet 501 was received and the packet timestamps indicating when the packet 501 was received by the networking device, enqueued, dequeued, etc. The metadata 522 can also include data produced by the networking device while processing a packet or assembling a packet. Such metadata 522 can include a PHV type 525 (e.g., "Ingress PHV").

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 can be obtained from the packet's layer 7 header. The other layer 7 data fields 520 can be obtained from the packet's layer 7 payload. The other header information 521 is the other information contained in the packet's layer 2, layer 3, layer 4, and layer 7 headers.

The packet 5-tuple 510 is often used for generating keys for match tables. The packet 5-tuple 510 can include packet header field values such as the source IP address 511, the source port 512, the protocol 513, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
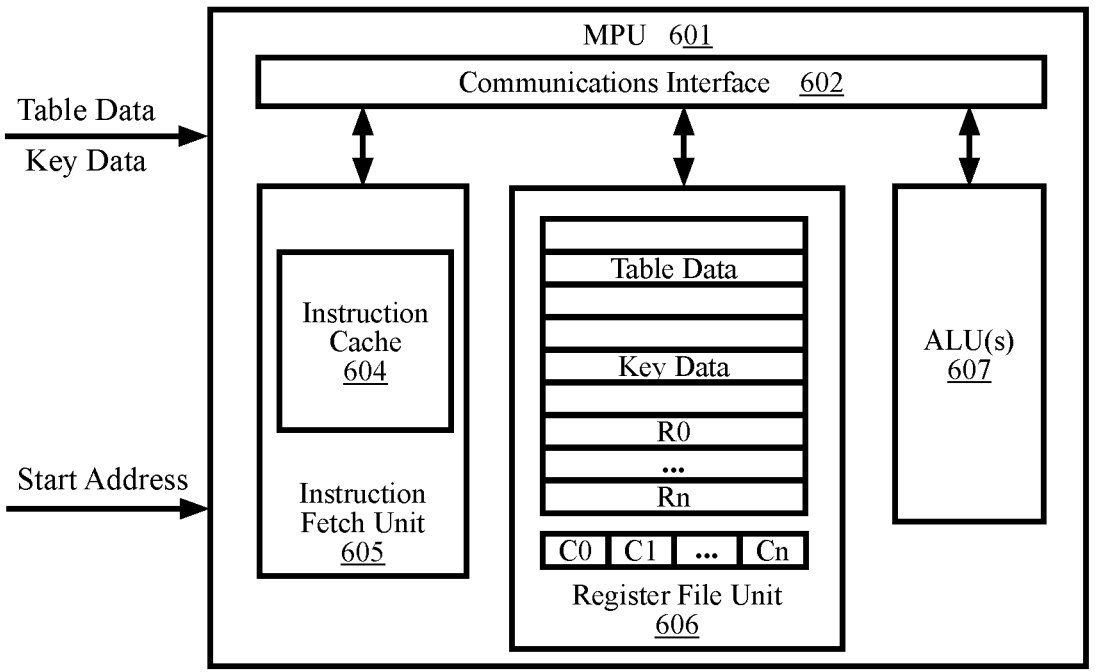
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU

601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the on-chip communications fabric system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
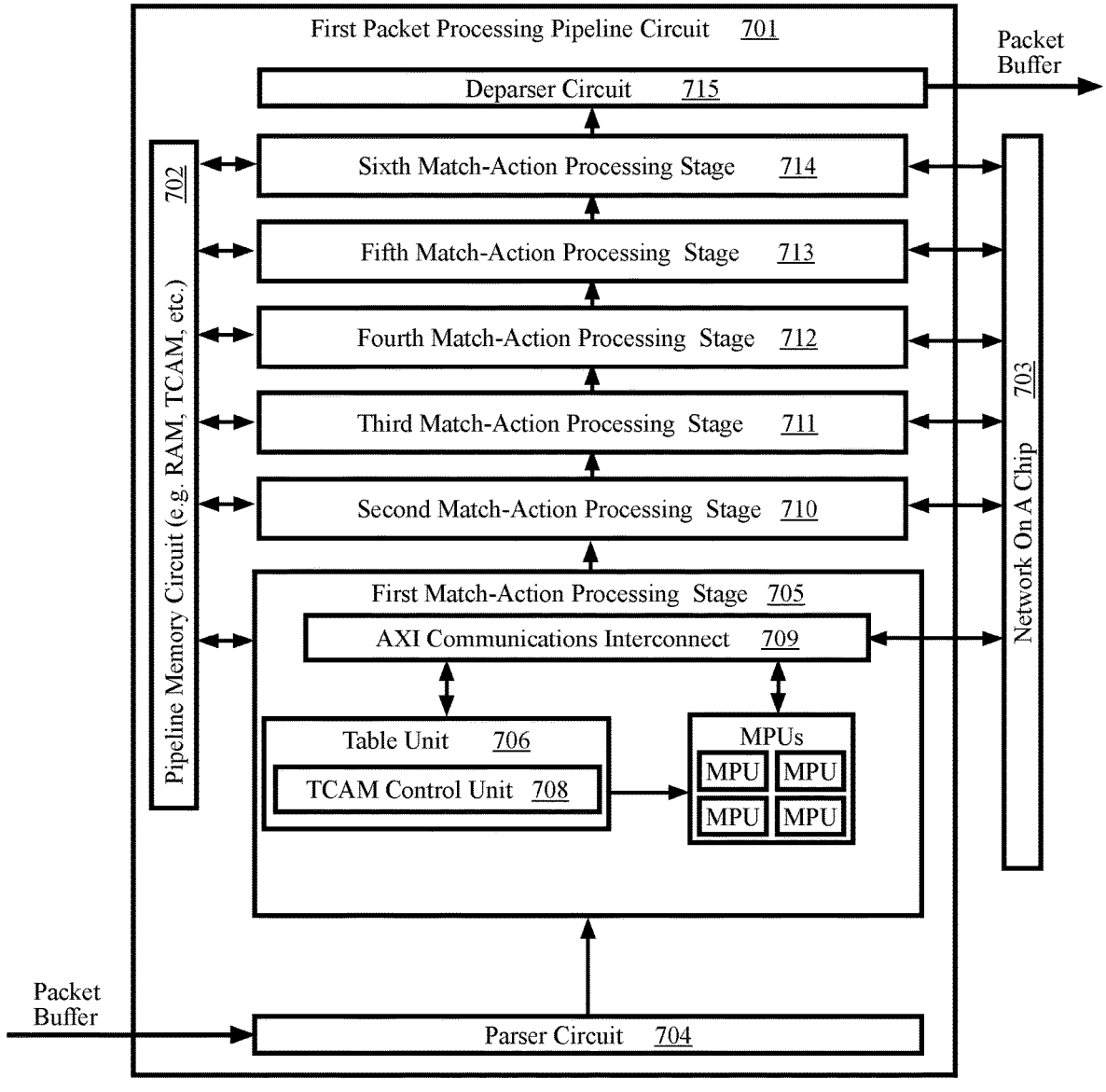
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 can be a P4 pipeline circuit in a semiconductor chip. The packet processing pipeline circuit 701 can be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline circuit 411 implements a match-action pipeline that can have a plurality of stages. For example, a packet entering the pipeline may be first parsed by a parser 704 that is implemented by a parser circuit and that parses the packet according to the packet header stack specified by a P4 program. This parsed representation of the packet may be referred to as a packet header vector (PHV). The PHV may then be passed through match-action processing stages (e.g., match-action processing stages 705, 710, 711, 712, 713, 714) of the match-action pipeline. Each match-action processing stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser circuit that implements a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The networking device 430 of FIG. 4 can have a P4 pipeline that is implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-action processing stages 705, 710, 711, 712, 713, 714 can be the same as the MPU 601 of FIG. 6. Match-action processing stages can have any number of MPUs. The match-action processing stage of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action processing stages such as the six units illustrated in the example of FIG. 7. In practice, a match-action pipeline can have any number of match-action processing stages. The match-action processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

The second packet processing pipeline circuit 425 includes a match-action pipeline 434. That match-action pipeline 434 can include match-action processing stages such as match-action processing stages 705, 710, 711, 712, 713, 714.

Figure 8:
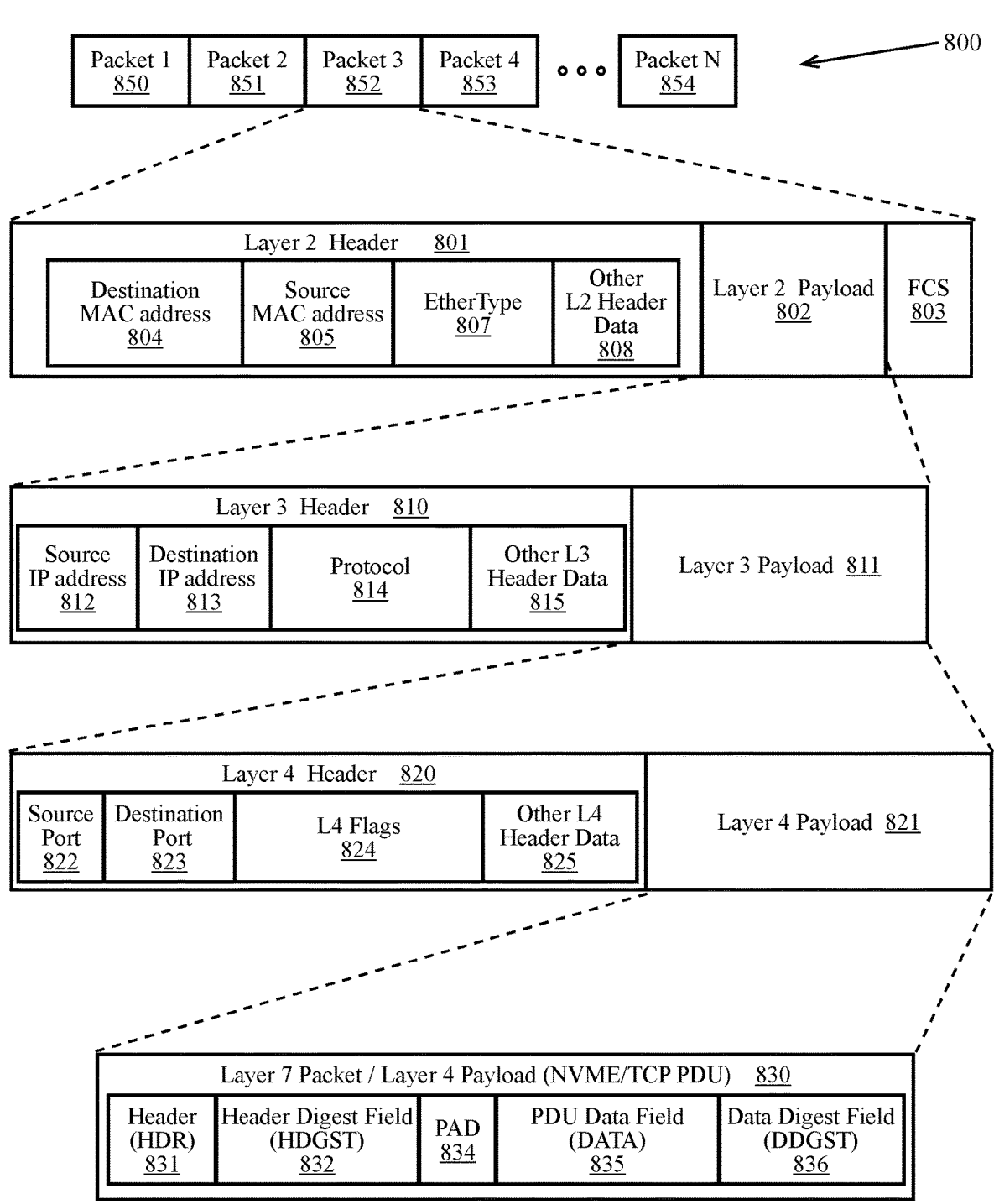
FIG. 8 illustrates packet headers and payloads of packets for network traffic flows including a NVMe/TCP PDU in a layer 4 payload according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a networking device 201 can have MAC addresses. A networking device 201 can have a MAC address that is applied to all or some of the ports. Alternatively, a networking device may have one or more ports that each have their own MAC address. In general, each port can send and receive packets. As such, a port of a networking device can be configured with a RX MAC 211 and a TX MAC 210. Ethernet, also known as Institute of Electrical and Electronics Engineers (IEEE)

802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be networking devices such as networking device 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) can have a layer 3 header 810 and a layer 3 payload 811. The layer 3 header of an IP packet is an IP header and the layer 3 payload of an IP packet is an IP payload. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet (a TCP packet is shown) can have a layer 4 header 820 (a TCP header is shown) and a layer 4 payload 821 (a TCP payload is shown). The layer 4 header 820 can include a source port indicator 822, destination port indicator 823, layer 4 flags 824, and other layer 4 header data 825. The source port indicator 822 and the destination port indicator 823 can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include NVMe/TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. The illustrated layer 7 packet is a NVMe/TCP PDU 830. NVM Express, Inc. is a trade organization that provides standards for NVMe communications. Version 1.0 of the NVM Express TCP Transport Specification was published on May 18, 2021 and discloses the contents and structure of NVMe PDUs. An NVMe/TCP PDU can include a header 831, a header digest field 832, a pad 834, a PDU data field 835, and a data digest field 836. The PDU data field 835 can hold the first encrypted block 438. When the PDU data field 835 holds the first encrypted block 438, the data digest field 836 should hold the digest value for the first encrypted block 438. The PDU data field 835 can hold numerous encrypted blocks. When the PDU data field 835 holds numerous encrypted blocks, the data digest field 836 should hold the digest value for the entire PDU data field 835. Such a digest value may be determined from the individual digest values of the numerous encrypted blocks in the PDU data field.

FIGS. 9-12 illustrate aspects of the RFC algorithm such as the tables required for an RFC style algorithm to determine which network rule should be applied to an IP packet. FIG. 9 illustrates a networking policy table 901 for a networking policy 900 according to some aspects. The table includes rules 902. A rule specifies an action 908 (the network rule outcome) to be applied to each IP packet that matches a specific set of criteria. The criteria include source IP 903, source port 904, destination IP 905, destination port 906, and protocol. The IP addresses and ports are usually specified as ranges. For example, those practiced in computer networking realize that 10.1.1.0/24 means IP addresses that have the same first 24 bits as 10.1.1.0, which is the IP address range 10.1.1.0-10.1.1.255. Four class tables for the networking policy 900 are also shown. The first class table 910 defines the first class identifier values 911 for the source IP ranges. The networking rules associated with each of the class identifier values are also shown. The first class identifier is shown as C1. C1=0 indicates that the first class identifier value is 0. C1=0 is used for source IP addresses that are not specified by a rule. C1=1 is used for source IP addresses in the 10.1.1.0/24 range. The networking policy table 901 indicates that the set of rules that may apply to IP addresses in the 10.1.1.0/24 range is R1, R2, R3, R5, R6, and R8. C1=1 is therefore associated with the rules R1, R2, R3, R5, R6, and R8.

The second class table 912 defines the second class identifier values 913 for the source port ranges. The networking rules associated with each of the class identifier values are also shown. The second class identifier is shown as C2. C2-0 indicates that the second class identifier value is 0. C2-0 is used for source ports that are not specified by a rule. C2=1 is used for source ports in the 200-299 range. The networking policy table 901 indicates that the set of rules that may apply to source ports in the 200-299 range is R1, R3, R4, R5, R6, and R8. C2=1 is therefore associated with the rules R1, R3, R4, R5, R6, and R8. The third class table 914 defines the third class identifier values 915 for the destination IP ranges. The networking rules associated with each of the class identifier values are also shown. The third class identifier is shown as C3. C3=0 indicates that the third class identifier value is 0. C3-0 is used for destination IP addresses that are not specified by a rule. C3=1 is used for destination IP addresses in the 50.1.1.0/24 range. The networking policy table 901 indicates that the set of rules that may apply to IP addresses in the 50.1.1.0/24 range is R1. C1=1 is therefore associated with the rule R1. The fourth class table 916 defines the fourth class identifier values 917 for the destination port ranges in combination with the protocol indicators. The networking rules associated with each of the class identifier values are also shown. The fourth class identifier is shown as C4. C4-0 indicates that the fourth class identifier value is 0. C4=0 is used for port and protocol ranges that are not specified by a rule. C4=1 is used for destination ports in the 200-299 range that are UDP ports. The networking policy table 901 indicates that the set of rules that may apply to UDP destination ports in the 200-299 range is R1, R2, R4, R5, R6, and R7. C4=1 is therefore associated with the rules R1, R2, R4, R5, R6, and R7.

FIG. 10 illustrates intersection tables that can be used for determining rules from class identifiers according to some aspects. The intersection table for the fifth class 1001 defines fifth class identifier values 1002 for various combinations of first class identifier values and second class identifier values. Every single combination is not explicitly shown because the table would not fit on the page. This is similar to the memory consumption problem of the RFC algorithm—the tables are too big. The networking rules associated with each of the class identifier value combinations are also shown. The fifth class identifier is shown as C5. C5=0 indicates that the fifth class identifier value is 0. C5=0 is used for combinations whose intersection is empty. For example, C1,C2=1,3 maps to C5-0 because there are no networking rules in the intersection of the sets associated with C1=1 and C2=3. C1,C2=1,1 maps to C5=1 which is associated with the set of rules that is the intersection of the sets associated with C1=1 and C2=1. C5=1 is therefore associated with the rules R1, R3, R5, R6, and R8. The intersection table for the sixth class 1003 defines sixth class identifier values 1004 for various combinations of third class identifier values and fourth class identifier values. Every single combination is not explicitly shown because the table would not fit on the page. This is similar to the memory consumption problem of the RFC algorithm—the tables are too big. The networking rules associated with each of the class identifier value combinations are also shown. The sixth class identifier is shown as C6. C6=0 indicates that the sixth class identifier value is 0. C6=0 is used for combinations whose intersection is empty. For example, C3, C4=1,2 maps to C6-0 because there are no networking rules in the intersection of the sets associated with C3=1 and C4=2. C3, C4=2, 1 maps to C6=2 which is associated with the set of rules that is the intersection of the sets associated with C3=2 and C4=1. C6=2 is therefore associated with the rules R2, R4, R6, and R7. The intersection table for the final mapping 1005 specifies the networking rules and network rule outcomes for various combinations of fifth class identifier values and sixth class identifier values. Every single combination is not explicitly shown because the table would not fit on the page. This is similar to the memory consumption problem of the RFC algorithm—the tables are too big. A dash, "-", indicates that there is no rule to apply and that a default action can be taken. For example, C5,C6=2,1 maps to "-" because there are no networking rules in the intersection of the sets associated with C5=2 and C6=1. C5,C6=1,2 maps to networking rule 6 (R6) whose action is Allow.

Figure 11:
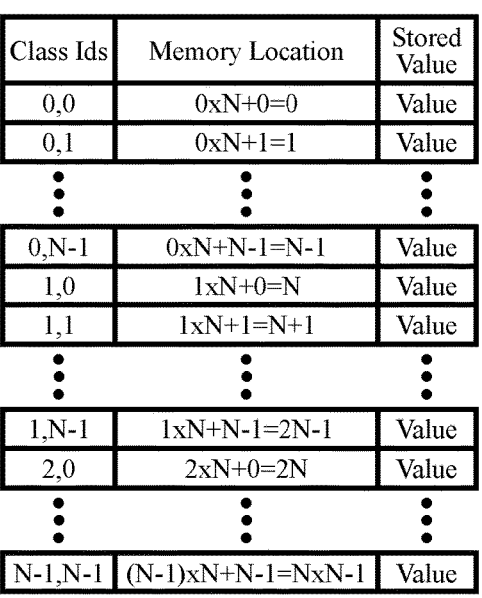
FIG. 11 illustrates an intersection table stored in memory according to some aspects.

FIG. 11 illustrates an intersection table stored in memory according to some aspects. The RFC algorithm gets its speed because the class identifiers can be used to calculate memory locations. The value at the memory location can be a value for another class identifier. For example, C3, C4=1,2 can be mapped to location N*1+2=N+2 where N is the number of class identifiers for the third class. As explained above, C3, C4=1,2 maps to C6-0. As such, the value stored at memory location N+2 would be 0. The value at a memory location may be a network rule outcome such as Allow or Drop when the intersection table is an intersection table for the final mapping. As was seen in FIG. 10, the intersection tables are extremely large and most of the values stored in them equals zero or default. It is the size of the intersection tables that makes the RFC algorithm unsuitable for networking policies that have many thousands of rules.

Figure 12:
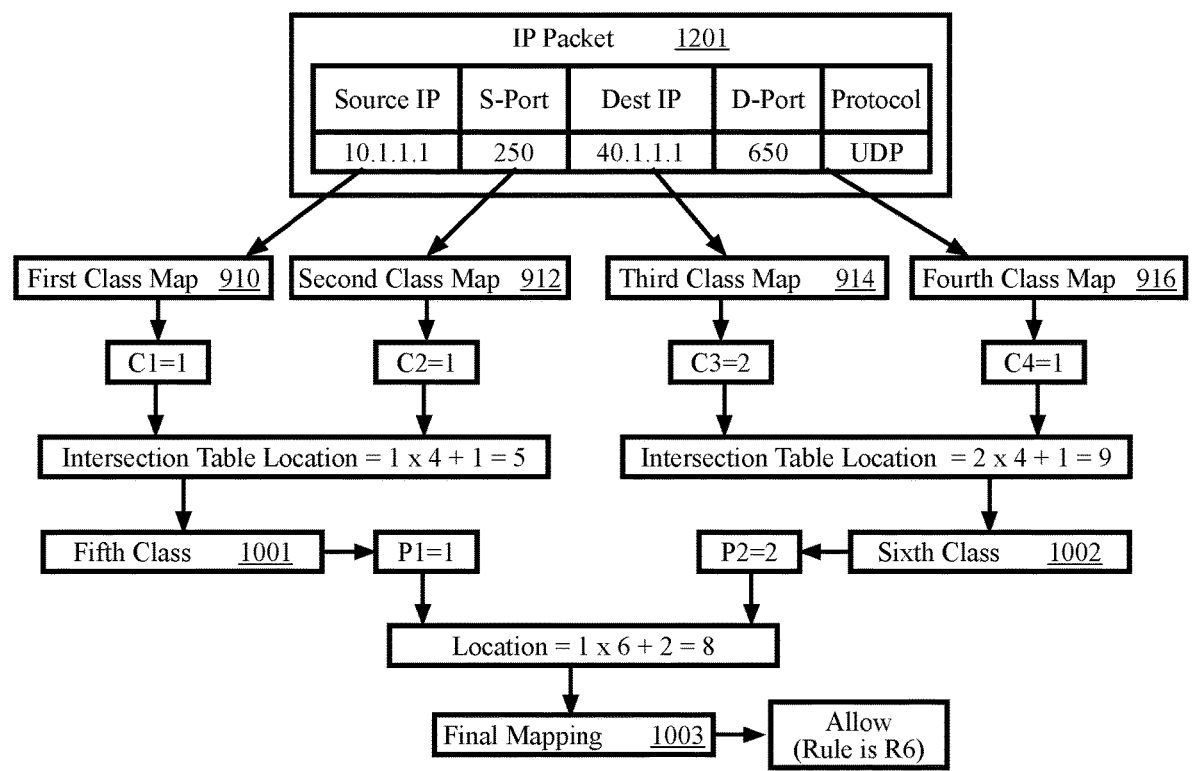
FIG. 12 illustrates determining a networking rule that is to be applied to an IP packet according to some aspects.

FIG. 12 illustrates determining a networking rule that is to be applied to an IP packet according to some aspects. An IP packet 1201 can be received by a networking device. The header fields of the network packet 1201 can be parsed to determine header field values such as the source IP address, source port number, destination IP address, destination port number, and the protocol indicator. The header field values can be used to find class identifiers by search mapping tables such as the tables illustrated in FIG. 9. The class identifiers can be used to calculate memory locations in intersection tables. When there are four class identifiers, three different intersections are needed. C1 and C2 can be used to determine the value for C5. C3 and C4 can be used to determine the value for C6. C5 and C6 can be used to determine the final result.

Figure 13:
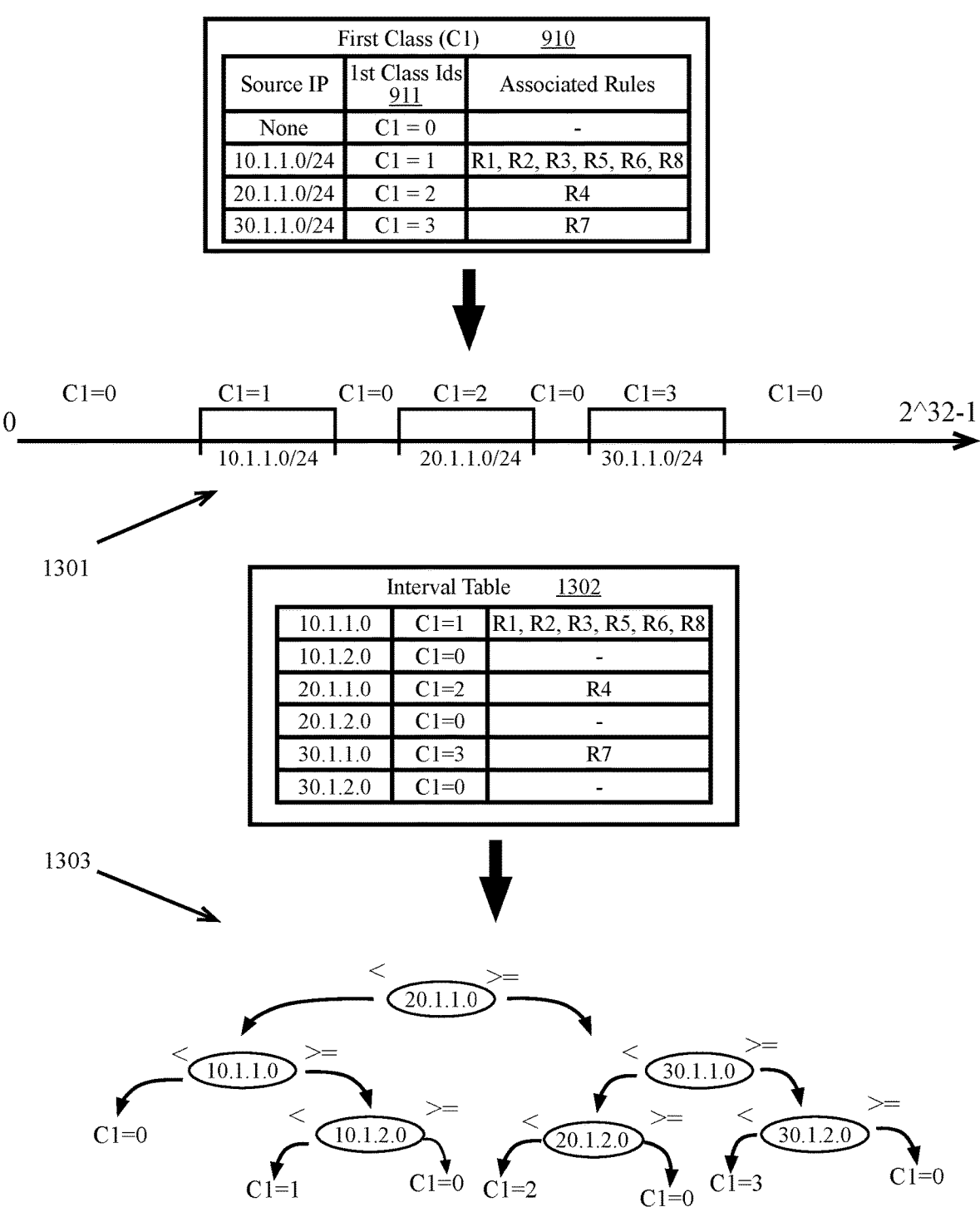
FIG. 13 is a high-level conceptual diagram that illustrates using a class table to produce an interval table and using the interval table to produce an interval binary tree according to some aspects.

FIG. 13 is a high-level conceptual diagram that illustrates using a class table 910 to produce an interval table 1302 and using the interval table 1302 to produce an interval binary tree 1303 according to some aspects. The key to making an interval table for IP addresses is to recognize all of the IP address ranges that are possible and to map each of those ranges to a class. The number line 1301 is presented to show, conceptually, each of the ranges for class table 910. The first range is 0-10.1.0.255, the second range is 10.1.1.0-10.1.1.255, the third range is 10.1.2.0-20.1.0.255, the fourth range is 20.1.1.0-20.1.1.255, the fifth range is 20.1.2.0-30.1.0.255, the sixth range is 30.1.1.0-30.1.1.255, the seventh (last) range is 30.1.2.0-255.255.255.255. The first entry in the interval table is the lower address of the second range. The following entries are the lower addresses of the subsequent ranges. Next, class numbers are assigned to each range. The interval table associates each of the IP address ranges with class identifier values for a class identifier. C1-0 is used for classes that are not associated with any rules. The interval table can be used to define an interval search tree. The root node can be the address that is at, or near, the midpoint of the interval table. This essentially divides the interval table into an upper interval table and a lower interval table. The next tier of nodes can be the addresses at or near the midpoints of the upper interval table and the lower interval table. The entire interval search tree can be formed by recursively splitting the interval table and defining tree nodes as discussed above. Those practiced in computer programming are familiar with using recursive algorithms to produce binary trees. The class identifier values are located at the ends of the bottom nodes.

Figure 14:
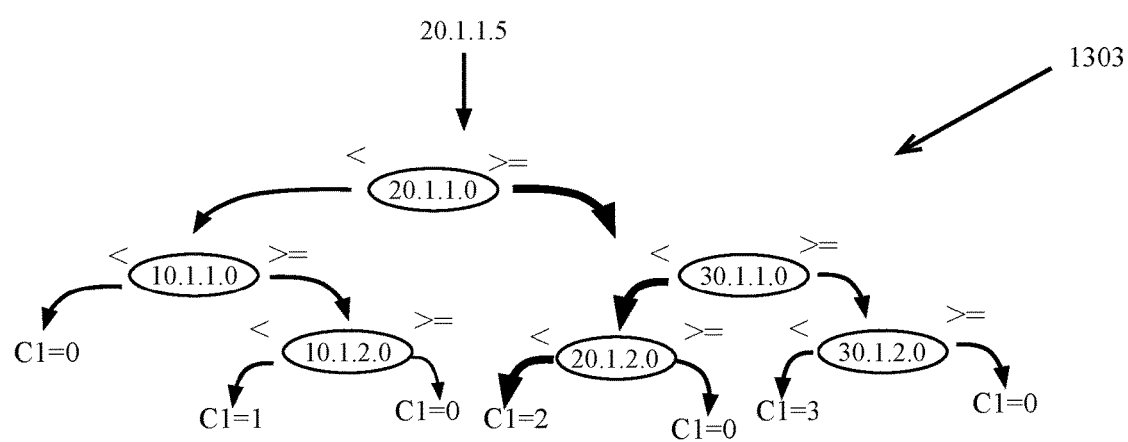
FIG. 14 is a high-level conceptual diagram that illustrates using an interval binary tree to determine a class identifier according to some aspects.

FIG. 14 is a high-level conceptual diagram that illustrates using an interval binary tree 1303 to determine a class identifier according to some aspects. The IP address 20.1.1.5 is being searched for. The root node is assigned the value 20.1.1.0. The search algorithm branches to the node assigned the value 30.1.1.0 because 20.1.1.5 is greater than or equal to 20.1.1.0. Next, the search algorithm branches to the node assigned the value 20.1.2.0 because 20.1.1.5 is less than 30.1.1.0. Next, the search algorithm determines that the class identifier value is C1=2 because 20.1.1.5 is less than 20.1.2.0.

Figure 15:
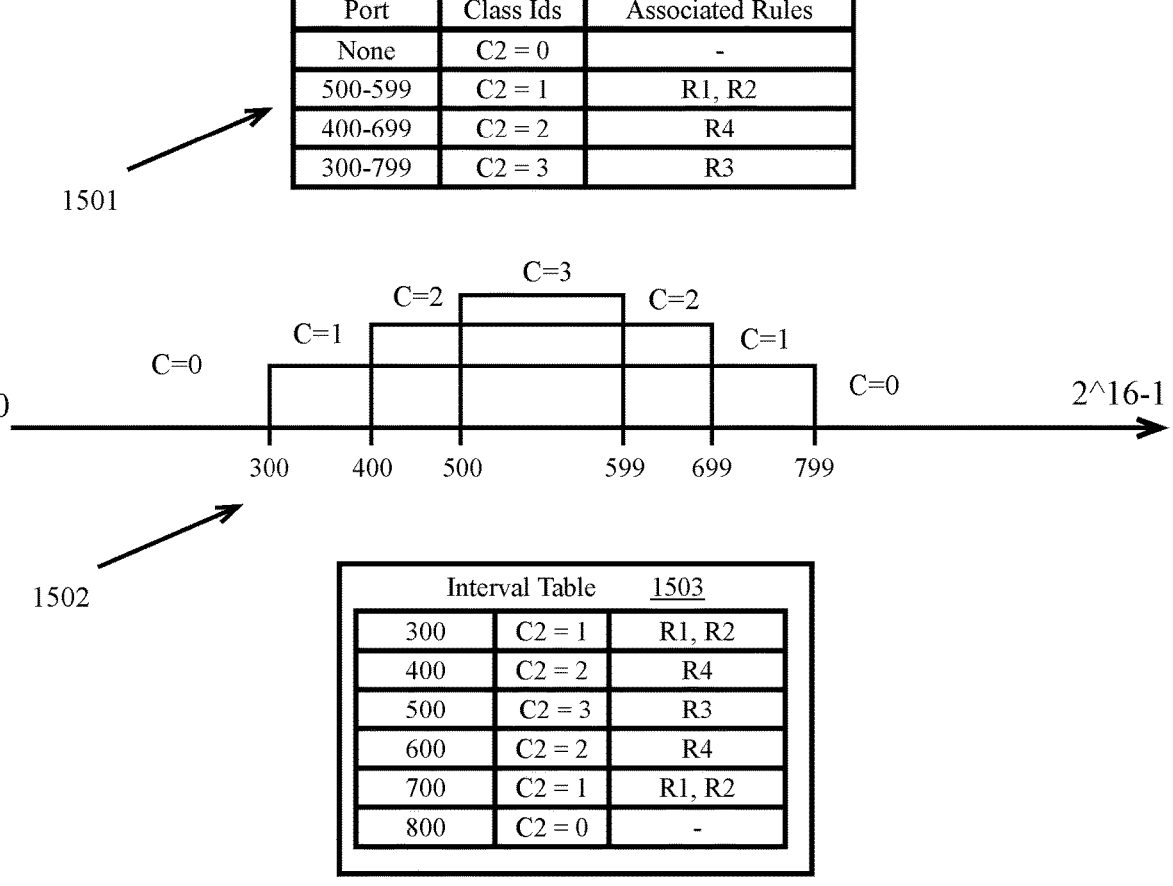
FIG. 15 is a high-level conceptual diagram that illustrates using an interval table for overlapping rules according to some aspects.

FIG. 15 is a high-level conceptual diagram that illustrates using an interval table for overlapping rules according to some aspects. The desired class identifier value is the one for the smallest port range that includes the port number being searched for. The class table 1501 includes four classes, including the default class. The ranges of all four classes overlap and the four classes result in seven port ranges. Analysis of overlapping ranges has led to the observation that the worst case for an M bit value is approximately M*N ranges when there are N rules. The first range is from 0 to 299, the second range is 300-399, the third range is 400-499, the fourth range is 500-599, the fifth range is 600-699, the sixth range is 700-799, the seventh range is 800-65535. As with the example illustrated in FIG. 13, the first entry in the interval table is the lower value of the second most range and the subsequent entries are the lower values of the subsequent ranges. Next, class identifiers are assigned to the interval table entries based on the rules that are to be applied for each range of values. The interval binary tree can be constructed as shown in FIG. 13 and discussed above. An important aspect shown in FIG. 15 is that the maximum size of the table is constrained by the number of bits in the value and the number of rules in the policy. As such, the amount of memory needed for the table is known ahead of time and can be allocated to the table. A further observation is that when there are no overlaps, as in FIG. 13, the size of the interval table is, at worst, about twice the number of rules. Overlaps occur when the range of values for a field in one rule overlaps the range of value for that field in another rule. For example, if the source port range of a rule is 10-20 and the source port range of another rule is 20-30 then there is a port overlap at 20 and the interval table must have an entry for the range 20-20. In this example, the range covers a single value. A similar example applies to IP address overlaps: if the source IP address range of a rule is 10.1.1.10-10.1.1.20 and the source IP address range of another rule is 10.1.1.20-10.1.1.30 then there is an IP address overlap at 10.1.1.20 and the interval table must have an entry for the range 10.1.1.20-10.1.1.20. IP address overlaps may also be called IP address range overlaps. Port overlaps may also be called port number range overlaps. As the number of overlaps increases, the number of rows in the interval table increases up to a maximum of approximately the number of rules times the number of bits in the value (e.g., 32 bits for IPV4, 16 bits for port numbers, etc.). The size of the interval tables may therefore be reduced by imposing a policy that limits the total number of overlaps. The size of the interval binary tree scales linearly with the number of rows in the interval table.

Figure 16:
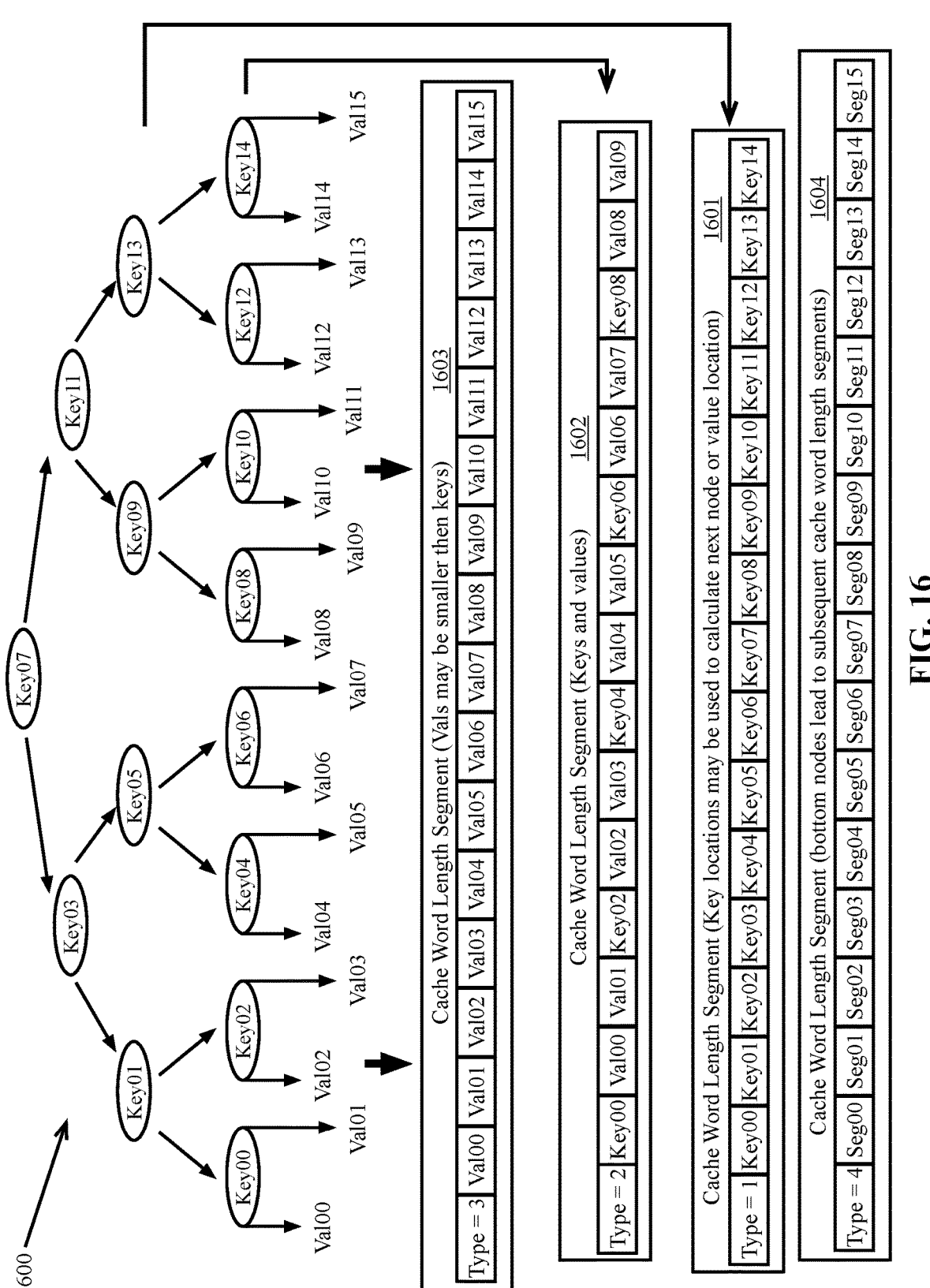
FIG. 16 is a high-level conceptual diagram that illustrates interval binary tree definitions according to some aspects.

FIG. 16 is a high-level conceptual diagram that illustrates interval binary tree definitions according to some aspects. Referring to FIG. 4, the memory interface 415 can include a cache controller and a cache memory. The cache controller can read data from the memory 432 in cache word length segments. For example, a cache word length may be 512 bytes. A cache word length segment is therefore 512 bytes long and the memory 432 is read in 512 byte blocks by the memory interface 415. An interval binary tree can be stored in memory as an interval binary tree definition that can specify the key (e.g., IPv4 address or port number) for each node such that an interval binary tree search algorithm can traverse the interval binary tree by traversing the interval binary tree definition. The cache word length segments can have segment type indicators that indicate the format of and data in a segment. One type of cache word length segment 1601 can store the keys for the nodes of an interval binary tree. Each cache word length segment 1601 can have a top node such as key07 that is always located in a specific position. The traversal of the tree can be encoded in the search algorithm such that the first child node of key07 is always key03, the second child node of key07 is always key11, etc. The final nodes (e.g., the even numbered keys) can be evaluated to determine the locations of output values. Another type of cache word length segment 1603 can store the values that are to be output as the final values of a search. Yet another type of cache word length segment 1604 can store the locations of subsequent portions of the interval tree definition. For example, Seg00 can indicate a memory location or a memory offset from the current location where another cache word length segment is stored. Another possible format is to indicate the location of Seg00 with the understanding that Seg01 immediately follows Seg00 in memory. Alternatively, the values in the type 3 segment 1603 can have flags (e.g., the most significant bit is the flag) that indicates whether the value is a final search value, a key, or an indicator of the location of a subsequent segment to be used for a subsequent part of the interval binary tree search. As such, the location of a following segment can be calculated. In this manner one cache word length segment can be used for performing part of a search and the output of that part of the search can indicate another cache word length segment that can be used for a subsequent part of the search. Still yet another type of segment 1602 can include keys and final values that are the child nodes of the keys and that may be the leaf nodes of the tree.

Figure 17A:
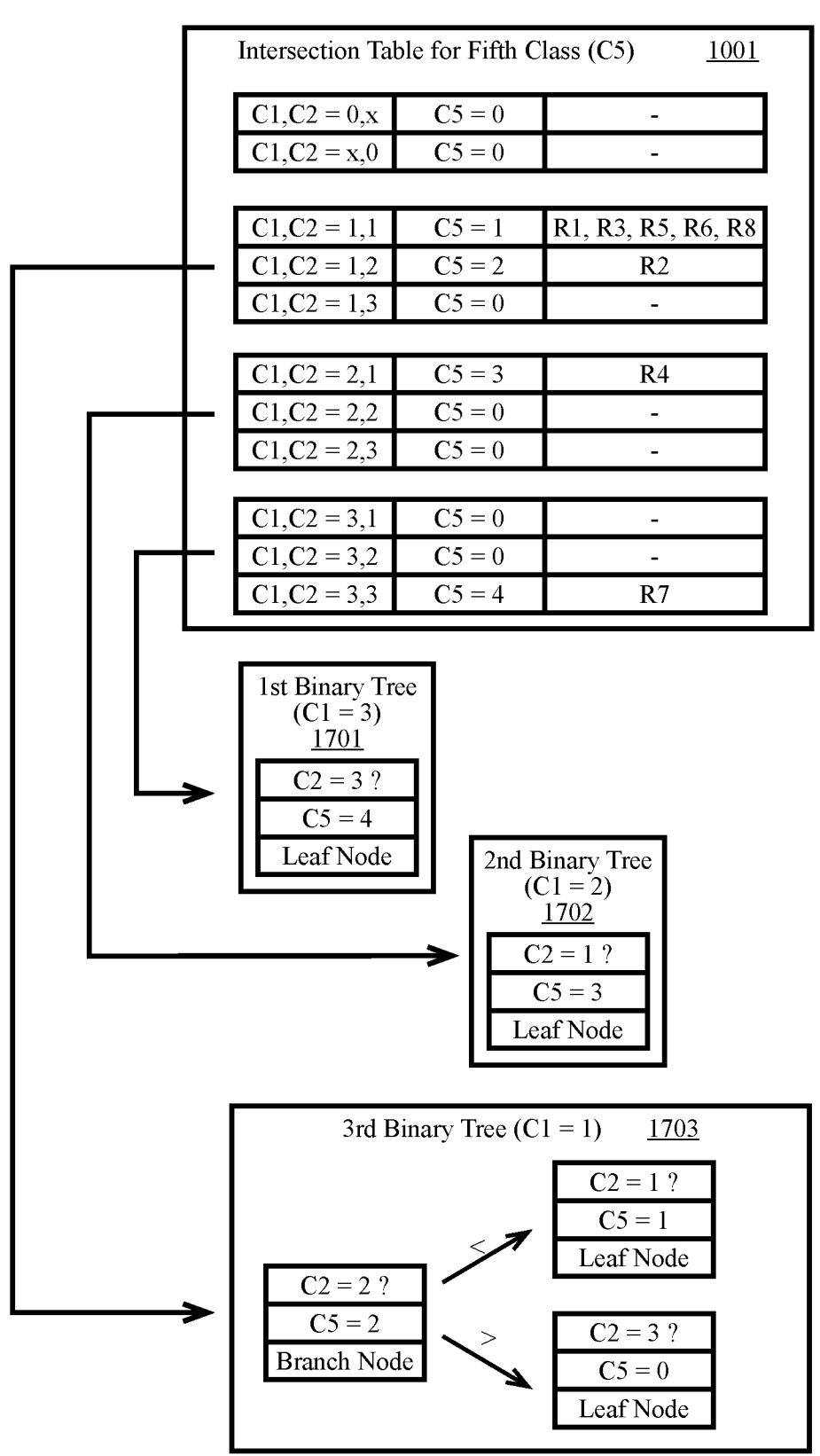
Figure 17C:
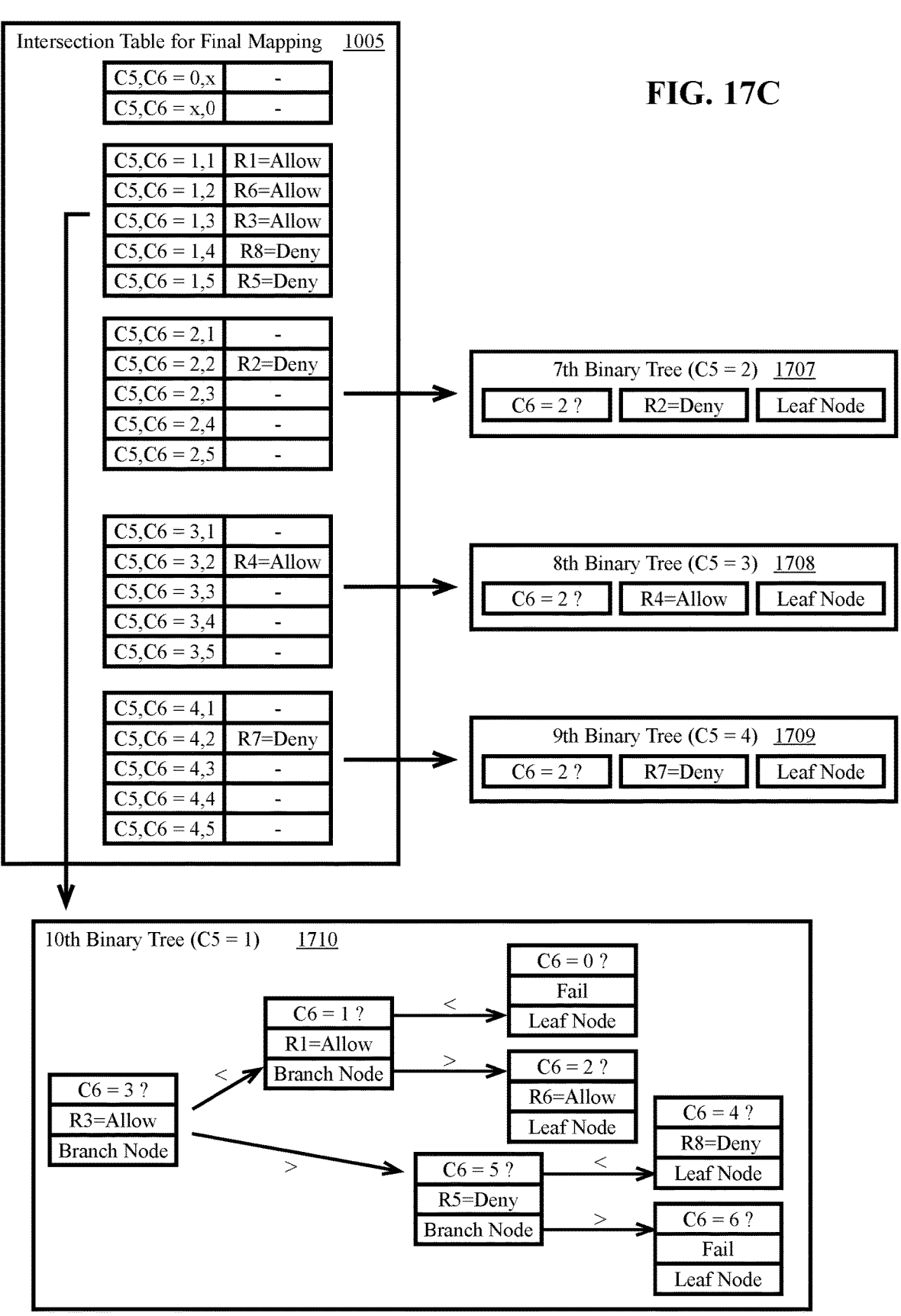

FIG. 17A, FIG. 17B, and FIG. 17C are high level conceptual diagrams that illustrate using binary trees to identify class Ids, network rules, and network outcomes according to some aspects. The intersections of FIG. 10 show the search outcomes for the binary trees.

The binary trees illustrated in FIG. 17A can be utilized to determine the fifth class identifier from the first class identifier and the second class identifier. The first class identifier is used to select a binary tree that is to be searched for the second class identifier. The first class identifier may therefore be a value that can be mapped to a binary tree, a memory location of a binary tree, the number of a pre-allocated block storing the binary tree, etc. When a pre-allocated block stores a binary tree, the address of the pre-allocated block can be the address of the binary tree. The search may be considered complete when the first class identifier value is zero because a value of zero may indicate a failed search. A failed search indicates that there is no matching rule and that a default action may be performed (e.g., drop packet and report error). The first binary tree 1701 is searched when the first class identifier value is 3. The second binary tree 1702 is searched when the first class identifier value is 2. The third binary tree 1703 is searched when the first class identifier value is 1. The first binary tree 1701 has a single node that is a leaf node. Searching a leaf node returns the node's return value when the query value equals the node's value and otherwise returns a fail. The fail may be returned by returning a return value of zero. Searching the first binary tree returns 4 (C5=4) when the query value is 3 (C2-3).

The second binary tree 1702 has a single node that is a leaf node. Searching the second binary tree returns 3 (C5=3) when the query value is 1 (C2=1). The third binary tree 1703 includes a branch node and leaf nodes. Searching a branch node returns the node's return value when the query value equals the node's value, otherwise the search branches to a first child node when the query value is less than the node's value or to a second child node when the query value is greater than the node's value. Searching the third binary tree begins with searching the C2=2 node. The search returns 2 (C5=2) when the query value is 2 (C2-2). If the query value is less than the node value (C2<2) then the search branches to the C2=1 node and otherwise branches to the C2=3 node. Searching the C2=1 node, a leaf node, returns 1 (C5=1) when the query value is 1 (C2=1). Searching the C2=3 node, a leaf node, returns 0 (C5=0, fail).

The binary trees illustrated in FIG. 17B can be utilized to determine the sixth class identifier from the third class identifier and the fourth class identifier. The third class identifier is used to select a binary tree that is to be searched for the fourth class identifier. The third class identifier may therefore be a value that can be mapped to a binary tree, a memory location of a binary tree, the number of a pre-allocated block storing the binary tree, etc. The search may be considered complete when the third class identifier value is zero because a value of zero may indicate a failed search. The fourth binary tree 1704 is searched when the third class identifier value is 3. The fifth binary tree 1705 is searched when the third class identifier value is 2. The sixth binary tree 1706 is searched when the third class identifier value is 1.

The fourth binary tree 1704 has a single node that is a leaf node. Searching the fourth binary tree returns 5 (C6-5) when the query value is 1 (C4=1). The fifth binary tree 1705 includes a branch node and leaf nodes. Searching the fifth binary tree begins with searching the C4=2 node. The search returns 3 (C6=3) when the query value is 2 (C4=2). If the query value is less than the node value (C4<2) then the search branches to the C4=1 node and otherwise branches to the C4=3 node. Searching the C4=1 node, a leaf node, returns 2 (C6-2) when the query value is 1 (C4=1). Searching the C4-3 node, a leaf node, returns 4 (C6=4) when the query value is 3 (C4-3). The sixth binary tree 1706 has a single node that is a leaf node. Searching the sixth binary tree returns 1 (C6=1) when the query value is 1 (C4=1).

The binary trees illustrated in FIG. 17C can be utilized to determine the networking rule or the networking rule outcome from the fifth class identifier and the sixth class identifier. The fifth class identifier is used to select a binary tree that is to be searched for the sixth class identifier. The fifth class identifier may therefore be a value that can be mapped to a binary tree, a memory location of a binary tree, the number of a pre-allocated block storing the binary tree, etc. The search may be considered complete when the fifth class identifier value is zero because a value of zero may indicate a failed search. The seventh binary tree 1707 is searched when the fifth class identifier value is 2. The eighth binary tree 1708 is searched when the fifth class identifier value is 3. The ninth binary tree 1709 is searched when the fifth class identifier value is 4. The tenth binary tree 1710 is searched when the fifth class identifier value is 5.

Searching the seventh binary tree can return R2 or "Deny" when the query value is 2 (C6=2) and otherwise returns 0 or fail. Searching the eighth binary tree can return R4 or "Allow" when the query value is 2 (C6=2) and otherwise returns 0 or fail. Searching the ninth binary tree can return R7 or "Deny" when the query value is 2 (C6=2) and otherwise returns 0 or fail. The tenth binary tree 1710 includes branch nodes and leaf nodes. Searching the fifth binary tree begins with searching the C6=3 node. The search returns R3 or "Allow" when the query value is 3 (C6=3). If the query value is less than the node value (C6<3) then the search branches to the C6=1 node and otherwise branches to the C6=5 node. Searching the C6=1 node returns R1 or "Allow" when the query value is 1 (C6=1). If the query value is less than the node value (C6<1) then the search branches to the C6-0 node and otherwise branches to the C6=2 node. Searching the C6-0 node returns 0 or fail. Searching the C6=2 node can return R6 or "Allow" when the query value is 2 (C6-2) and otherwise returns 0 or fail. Searching the C6=5 node returns R5 or "Deny" when the query value is 5 (C6-5). If the query value is less than the node value (C6<5) then the search branches to the C6=4 node and otherwise branches to the C6=6 node. Searching the C6-4 node can return R8 or "Deny" when the query value is 4 (C6=4) and otherwise returns 0 or fail. Searching the C6=6 node returns 0 or fail.

Figure 18:
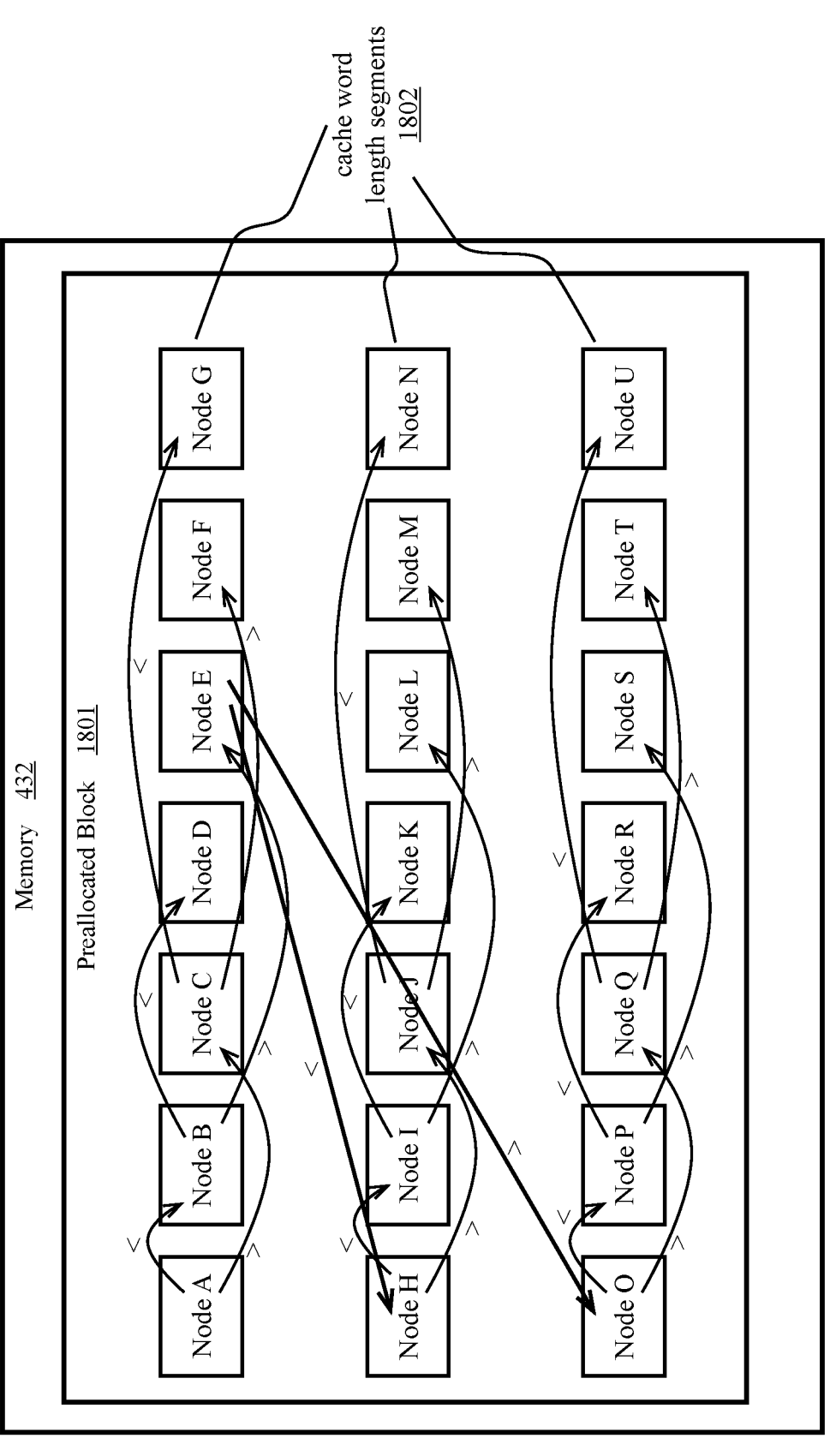
FIG. 18 is a high-level conceptual diagram that illustrates storing a binary tree definition in a memory according to some aspects.

FIG. 18 is a high-level conceptual diagram that illustrates storing a binary tree definition in a memory 432 according to some aspects. The nodes of a binary tree definition can be stored in cache word length segments such that parts of the binary tree can be read from memory as cache words and then those parts used to perform parts of a binary search. Node A is illustrated as a branch node that has node B and node C as child nodes. Node B is illustrated as a branch node that has node D and node E as child nodes. Node C is illustrated as a branch node that has node F and node G as child nodes. Node D, node F, and node G are illustrated as leaf nodes because they have no child nodes. Node E is illustrated as a branch node that has node H and node O as child nodes. Node H is the first node in another cache word length segment. Node O is the first node in yet another cache word length segment. When the search branches from node E to node H, the cache word length segment containing node H is read from memory. When the search branches from node E to node O, the cache word length segment containing node O is read from memory 432. The cache word length segments 1802 can be stored in a pre-allocated block 1801 of the memory 432. A pre-allocated block can be a block of memory that is allocated for or set aside for a specific purpose when the network device is initialized or booted. The memory for the binary search tree definitions can be pre-allocated because the maximum amount of memory required for the binary search trees is a function of the number of rules and the number of overlaps. The maximum number of rules and the maximum number of overlaps can be configuration parameters that are known when the networking device starts up. As such, the maximum amount of memory that may be needed for storing the binary tree definitions can be set aside as pre-allocated blocks.

Figure 19A:
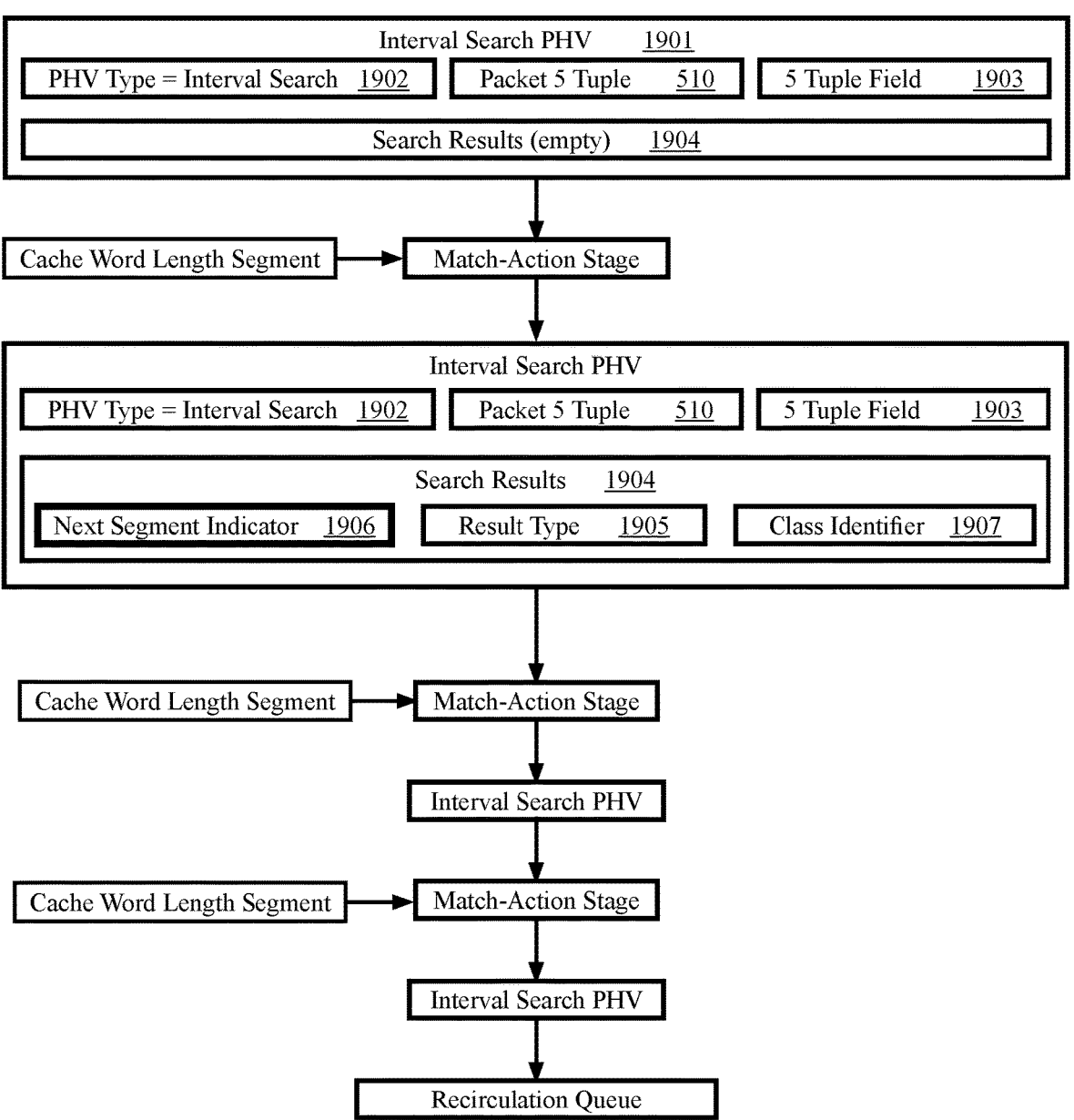
FIG. 19A is a high-level conceptual diagram that illustrates using a match-action pipeline to perform an interval binary tree search according to some aspects.

FIG. 19A is a high-level conceptual diagram that illustrates using a match-action pipeline to perform an interval binary tree search according to some aspects. An IP packet has been received and the action to apply to the IP packet is to be determined. The IP packet has a 5-tuple 510. One input to the first match-action stage of the match-action pipeline is an interval search PHV 1901 that includes a PHV type field 1902, the packet 5-tuple 510, a 5-tuple field 1903, and search results 1904. The PHV type 1902 of the PHV 1901 indicates that it is an interval search PHV. The search results 1904 is initially empty. The 5-tuple field 1903 is or indicates the field value that is being searched for. For example, if the search is for the source IP address, the 5-tuple field 1903 can contain the source IP address or can be metadata indicating the source IP field in the 5-tuple. Another input to the first match-action stage is a cache word length segment that includes an interval binary tree definition or a portion of an interval binary tree definition. An interval binary tree definition specifies an entire interval binary tree and searching that tree results in producing search results 1904 that can include a class identifier 1907. The search results can also include a result type 1905 that indicates whether the search results indicate a class identifier, or a next segment indicator 1906. A portion of an interval binary tree definition specifies a portion of an interval binary tree and searching that portion of the tree can result in identifying a next segment indicator 1906. The next segment indicator can indicate another part of the interval binary tree. The next segment indicator 1906 can indicate a location in memory where the subsequent cache word length segment is located. The subsequent cache word length segment can contain another portion of an interval binary tree definition that defines a subsequent portion of an interval binary tree that can be searched by the subsequent match-action stage to obtain a subsequent search result. The match-action stages of the match-action pipeline can continue searching portions of the interval binary tree until a final result, the class identifier, is produced. In some cases, an interval search PHV must be recirculated through the pipeline because the last match-action stage in the match-action pipeline does not produce a final result. A PHV can be recirculated through a pipeline by placing the PHV back on the pipeline's input queue or in a recirculation queue.

Figure 19B:
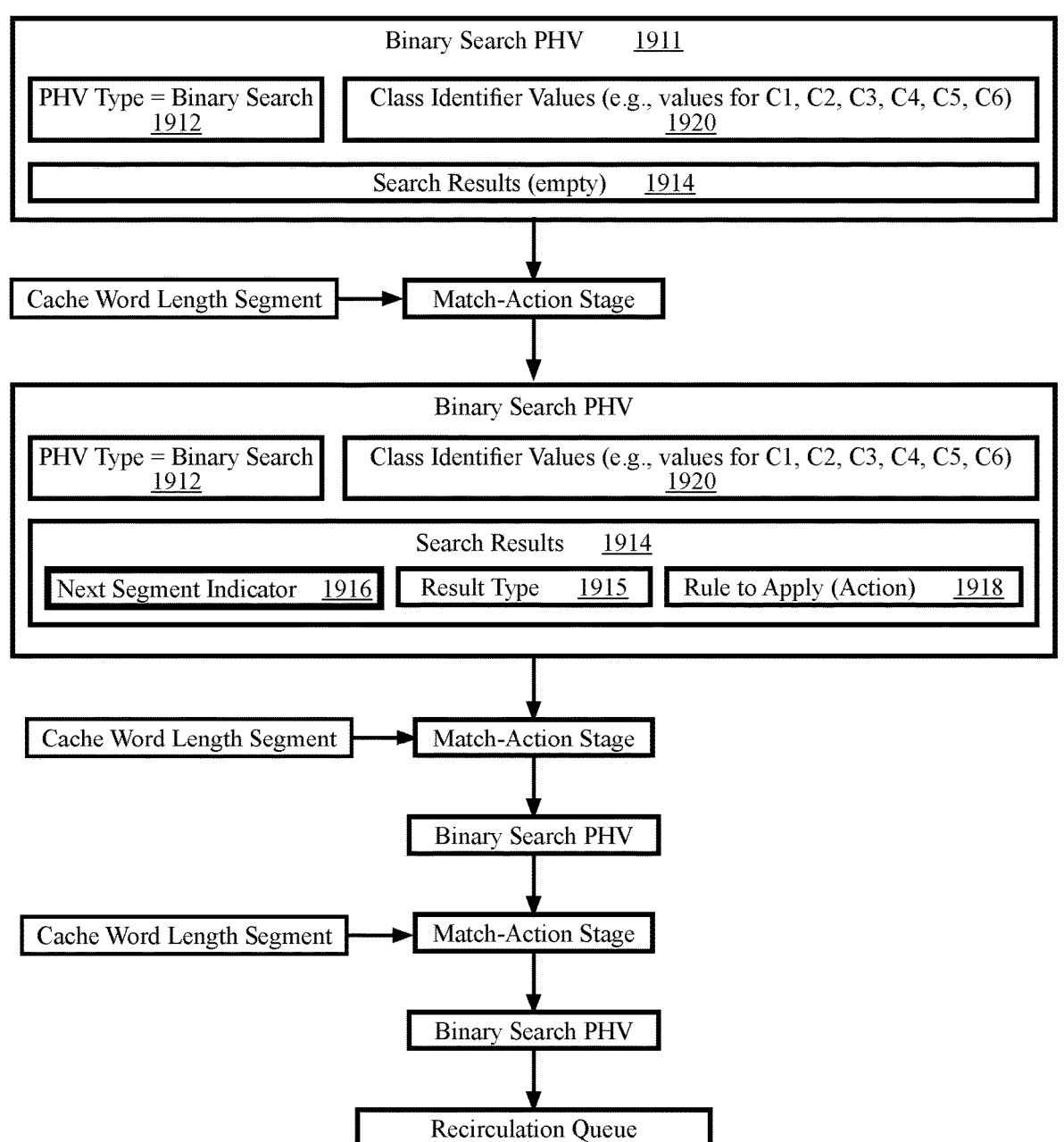
FIG. 19B is a high-level conceptual diagram that illustrates using a match-action pipeline to perform a binary tree search according to some aspects.

FIG. 19B is a high-level conceptual diagram that illustrates using a match-action pipeline to perform a binary tree search according to some aspects. An IP packet has been received and the action to apply to the IP packet is to be determined. The values in the IP packet's header fields have been searched for in interval binary trees to determine the class identifier values 1920 to be searched for in the binary trees. One input to the first match-action stage of the match-action pipeline is a binary search PHV 1911 that includes a PHV type field 1912, the class identifier values 1920, and search results 1914. The PHV type 1912 of the PHV 1911 indicates that it is a binary search PHV. The search results 1914 is initially empty. The class identifier values 1920 can include a first class identifier value that indicates a binary tree to search (e.g., a value for C1, C3, or C5) and a second class identifier to be searched for in the binary tree (e.g., value for C2, C4, or C6). The first match-action stage can indicate a memory location, a pre-allocated block identifier, or a value that is mapped to a memory location or a pre-allocated block identifier. The match-action stage can use the first class identifier value to read a cache word length segment. The cache word length segment can contain all or part of a binary tree definition for a binary tree. A binary tree definition specifies an entire binary tree and searching that portion of the tree results in producing search results 1914 that can include a class identifier value 1920 or a rule to apply 1918. The rule to apply 1918 can identify a rule (e.g., R56) or an action (e.g., allow, drop, deny, etc.) to be applied to the network packet. The search results can also include a result type 1915 that indicates whether the search results indicate a class identifier, a rule to apply 1918, or a next segment indicator 1916. A portion of a binary tree definition specifies a portion of a binary tree and searching that portion of the tree can result in identifying a next segment indicator 1916. The next segment indicator can indicate another part of the binary tree. The next segment indicator 1906 can indicate a location in memory where the subsequent cache word length segment is located. The subsequent cache word length segment can contain another portion of the binary tree definition that defines a subsequent portion of the binary tree that can be searched by the subsequent match-action stage to obtain a subsequent search result. The match-action stages of the match-action pipeline can continue searching portions of the interval binary tree until a final result is produced. In some cases, an interval search PHV must be recirculated through the pipeline because the last match-action stage in the match-action pipeline does not produce a final result. A PHV can be recirculated through a pipeline by placing the PHV back on the pipeline's input queue or in a recirculation queue.

Figure 20:
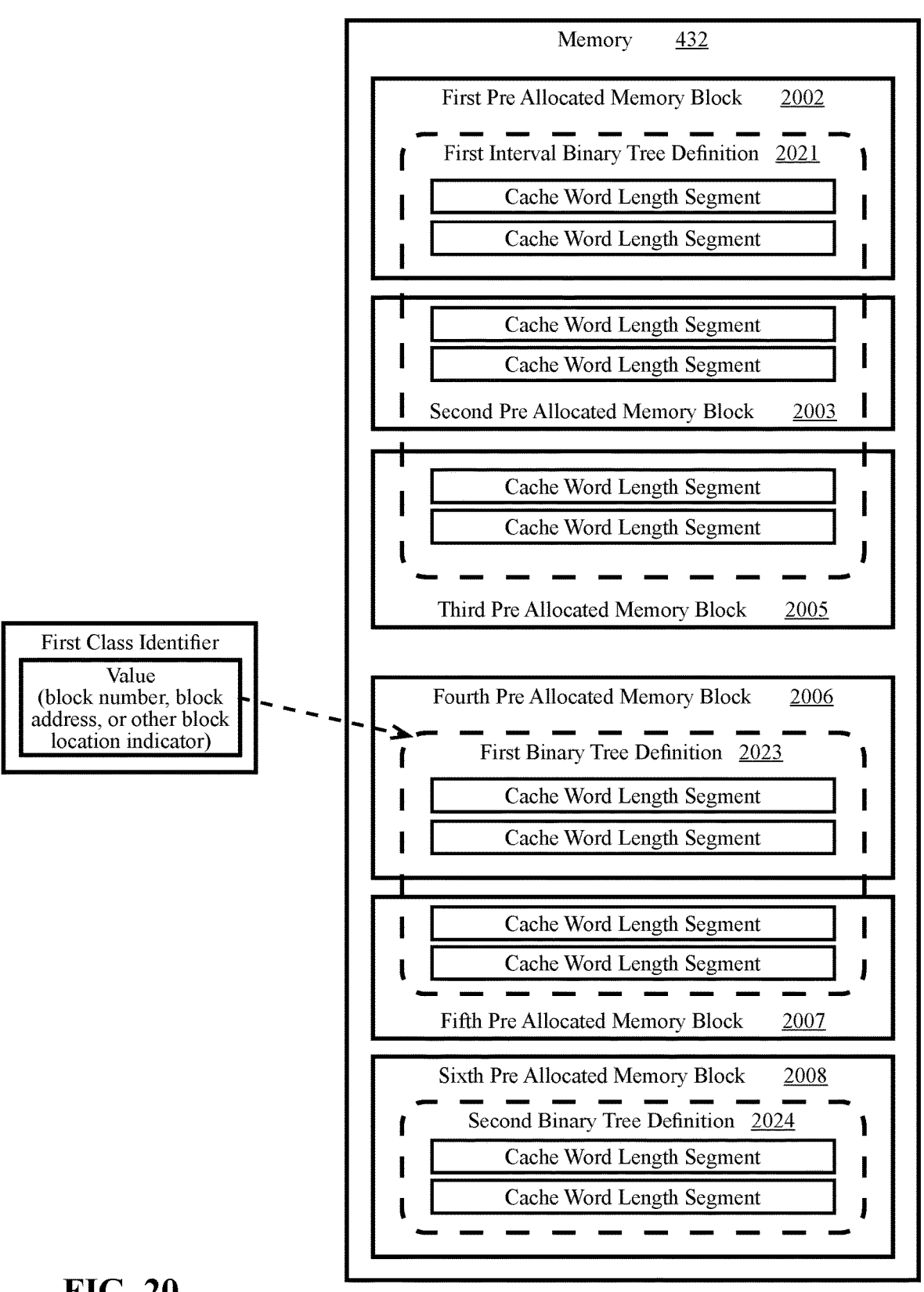
FIG. 20 is a high-level conceptual diagram that illustrates interval binary tree definitions stored in pre-allocated blocks of a memory according to some aspects.

FIG. 20 is a high-level conceptual diagram that illustrates an interval binary tree definition and two binary tree definitions stored in pre-allocated blocks of a memory according to some aspects. In order to perform the searches rapidly, the interval binary tree definitions and the binary tree definitions are stored in memory 432 which can be a fast memory such as DDR5 SDRAM. Two searches are performed in order to determine the first class identifier (e.g., C1) and the second class identifier (e.g., C2). The first search can use a first interval binary tree definition 2021 for a first interval binary tree to search the first interval binary tree for a first packet header field value (e.g., the source IP address) and thereby determine the first class identifier. The second search can use a second interval binary tree definition for a second interval binary tree to search the second interval binary tree for a second packet header field value (e.g., the source port number) and thereby determine the second class identifier. The first class identifier can indicate a binary tree definition for a binary tree that is to be searched for the second class identifier. As discussed above, the interval binary tree for a search can cover the entire range of IP addresses, the entire range of port numbers, and the entire range of protocol indicators that can be in an IP packet. The amount of memory required for storing that tree is known to be limited to a size that scales at worst linearly with respect to the number of rules. More formally, the required memory scaling linearly with the number of rules means that the required memory is O(N) where N is the number of rules. The memory required for storing all of the interval binary trees that may be searched for class identifiers are also O(N). As such, all the memory for the interval search trees can be pre-allocated. The memory required for storing the binary trees is also O(N) and, as such, all the memory for the binary trees can be pre-allocated. Pre-allocated means that the memory is set aside for a certain use such that it is guaranteed to be available for that use.

The pre-allocated memory may be divided into pre-allocated blocks. More than one of the pre-allocated blocks may be needed to store one of the interval binary tree definitions. The first interval binary tree definition 2021 is stored in the first pre-allocated memory block 2002, the second pre-allocated memory block 2003, and the third pre-allocated memory block 2005. Other interval binary tree definitions can be stored in other pre-allocated blocks. More than one of the pre-allocated blocks may be needed to store one of the binary tree definitions. The first binary tree definition 2023 is stored in the fourth pre-allocated memory block 2006, and the fifth pre-allocated memory block 2007. The second binary tree definition 2024 is stored entirely in the sixth pre-allocated memory block 2008. Other binary tree definitions can be stored in other pre-allocated blocks. In practice, all of the interval binary tree definitions consume a large number of pre-allocated blocks whereas many of the binary tree definitions may fit entirely inside one of the pre-allocated blocks.

The memory required for the first interval binary tree definition can be a set of pre-allocated blocks. For example, the maximum amount of memory that is required may be calculated by multiplying the number of rules by a constant to yield a requirement of 8 MB. That 8 MB of memory may be divided in pre-allocated blocks such as the first pre-allocated memory block 2002, the second pre-allocated memory block 2003, and the third pre-allocated memory block 2005. The memory required for the other interval binary tree definitions can also be a set of pre-allocated blocks. Each pre-allocated memory block can be the same size, such as 4 KB. As such, the 8 MB of memory would contain 2K pre-allocated memory blocks. Many processors use 32 bits to specify a memory location. However, only 11 bits are required to specify one of the 2K blocks because the base address and the size of the blocks is known. 11 bits instead of 32 bits is a considerable savings when special purpose circuits are designed and used or when 16 bit or 8 bit ALUs are used. Every interval binary tree definition can be aligned to start at the first memory location in one of the blocks.

The memory required for the first binary tree definition can be a set of pre-allocated blocks. For example, the maximum amount of memory that is required may be calculated by multiplying the number of rules by a constant to yield a requirement of 16 MB. That 16 MB of memory may be divided in pre-allocated blocks. The memory required for the other binary tree definitions can also be sets of pre-allocated blocks. Each pre-allocated memory block can be the same size, such as 4 KB. As such, the 16 MB of memory would contain 4K pre-allocated memory blocks. Many processors use 32 bits to specify a memory location. However, only 12 bits are required to specify one of the 4K blocks because the base address and the size of the blocks is known. 12 bits instead of 32 bits is a considerable savings when special purpose circuits are designed and used or when 16 bit or 8 bit ALUs are used. Every binary tree definition can be aligned to start at the first memory location in one of the blocks. As such, a class identifier can be a block number, a block address, or some other block location indicator. Returning to the example, the class identifiers can be the 12 bit block numbers. In this way, class identifiers can be used to specify binary tree definitions as shown in FIG. 1.

FIG. 20 illustrates two binary tree definitions stored in pre-allocated blocks. The first binary tree definition 2023 begins at the start of the fourth pre-allocated memory block 2006 and continues into the fifth pre-allocated memory block 2007. As such, a class identifier indicating the first binary tree definition 2023 can indicate the fourth pre-allocated memory block 2006. The second binary tree definition 2024 begins at the start of the sixth pre-allocated memory block 2008. As such, a class identifier indicating the second binary tree definition 2024 can indicate the sixth pre-allocated memory block 2008. No class identifier should indicate the fifth pre-allocated memory block 2007 because no binary tree definition starts at that location. It follows that a class identifier may not use some values when the class identifier values indicate pre-allocated blocks.

Figure 21:
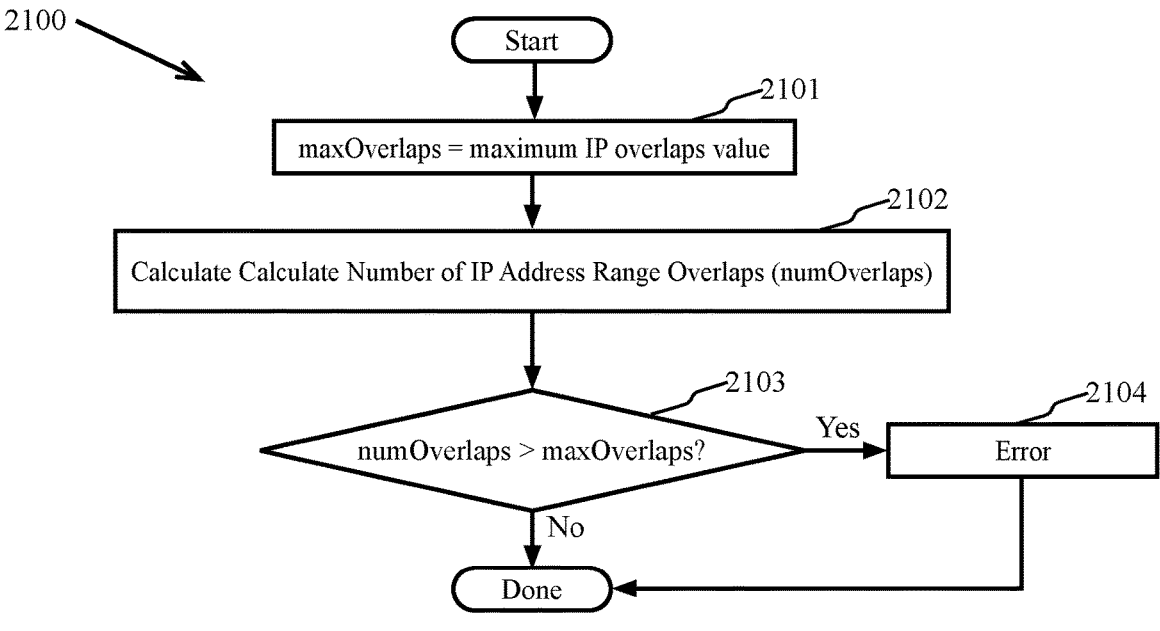
FIG. 21 is a high-level flow diagram that illustrates limiting the number of IP address range overlaps according to some aspects.

FIG. 21 is a high-level flow diagram that illustrates a process that limits the number of IP address range overlaps 2100 according to some aspects. As discussed above, the number of overlaps of IP address ranges or port number ranges in the network rules increases the number of intervals in the interval tables and the size of the interval binary tree definitions. A network service provider, a data center operator, or a network device provider may therefore limit the number of allowable overlaps to thereby reduce the size of the interval binary trees. Smaller interval binary trees can be searched more quickly and require less memory to store. After the start, at block 2101 the maxOverlaps variable is set to the maximum IP overlaps value that specifies the maximum number of overlaps of IP addresses that is allowed in a network policy table. At block 2102, the number of IP address overlaps in the network policy tables is calculated. At decision block 2103, the number of overlaps is compared to maxOverlaps. If the number of overlaps is not greater than maxOverlaps then the process is done. Otherwise, an error is generated and reported at block 2104 before the process is done.

Figure 22:
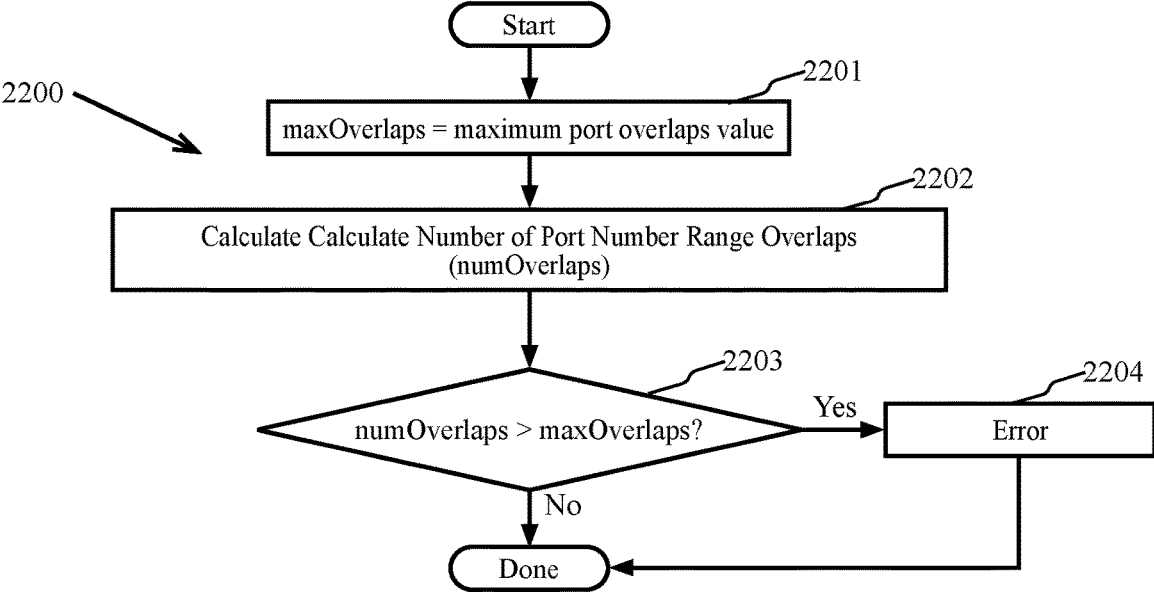
FIG. 22 is a high-level flow diagram that illustrates limiting the number of port number interval overlaps according to some aspects.

FIG. 22 is a high-level flow diagram that illustrates a process that limits the number of port number interval overlaps 2200 according to some aspects. After the start, at block 2201 the maxOverlaps variable is set to the maximum port overlaps value that specifies the maximum number of overlaps of port numbers that are allowed in a network policy table. At block 2202, the number of port number range overlaps in the network policy tables is calculated. At decision block 2203, the number of overlaps is compared to maxOverlaps. If the number of overlaps is not greater than maxOverlaps then the process is done. Otherwise, an error is generated and reported at block 2204 before the process is done.

FIG. 23 is a high-level flow diagram that illustrates a process performing an interval binary tree search according to some aspects. After the start, at block 2301 the process receives a value to search for (e.g., IP address, port number, etc.). At block 2302, the process sets the current segment to the first cache word length segment of an interval binary tree definition. At block 2303, the process sets the current node to the top node of the current segment (e.g., the Key07 node of FIG. 16). At decision block 2304, the process compares the node value (e.g., the keys in FIG. 16 and the IP addresses in FIG. 14) of the current node to the value. If the value is less than the node value then the process moves to block 2305, otherwise the process moves to block 2306. At block 2305, the first child (e.g., a left child node in FIGS. 14, 16) of the current node becomes the current node before the process moves to decision block 2307. At block 2306, the second child (e.g., a right child node in FIGS. 14, 16) of the current node becomes the current node before the process moves to decision block 2307. At decision block 2307, the process determines if the current node is a final value (e.g., class identifier, networking action, etc.). If the current node is a final value, then the process moves to block 2308 where the final value is returned before the process is done. If the current node is not a final value then the process moves to decision block 2309. At decision block 2309, the process determines if the current node indicates the top node (e.g., the Key07 node of FIG. 16) of a new cache line length segment. If the current node indicates the top node of a new cache line length segment the process moves to block 2310, otherwise the process loops back to decision block 2304. At block 2310, the new cache line length segment is read and the current segment is set to the new cache line length segment before the process loops back to block 2303.

Figure 24:
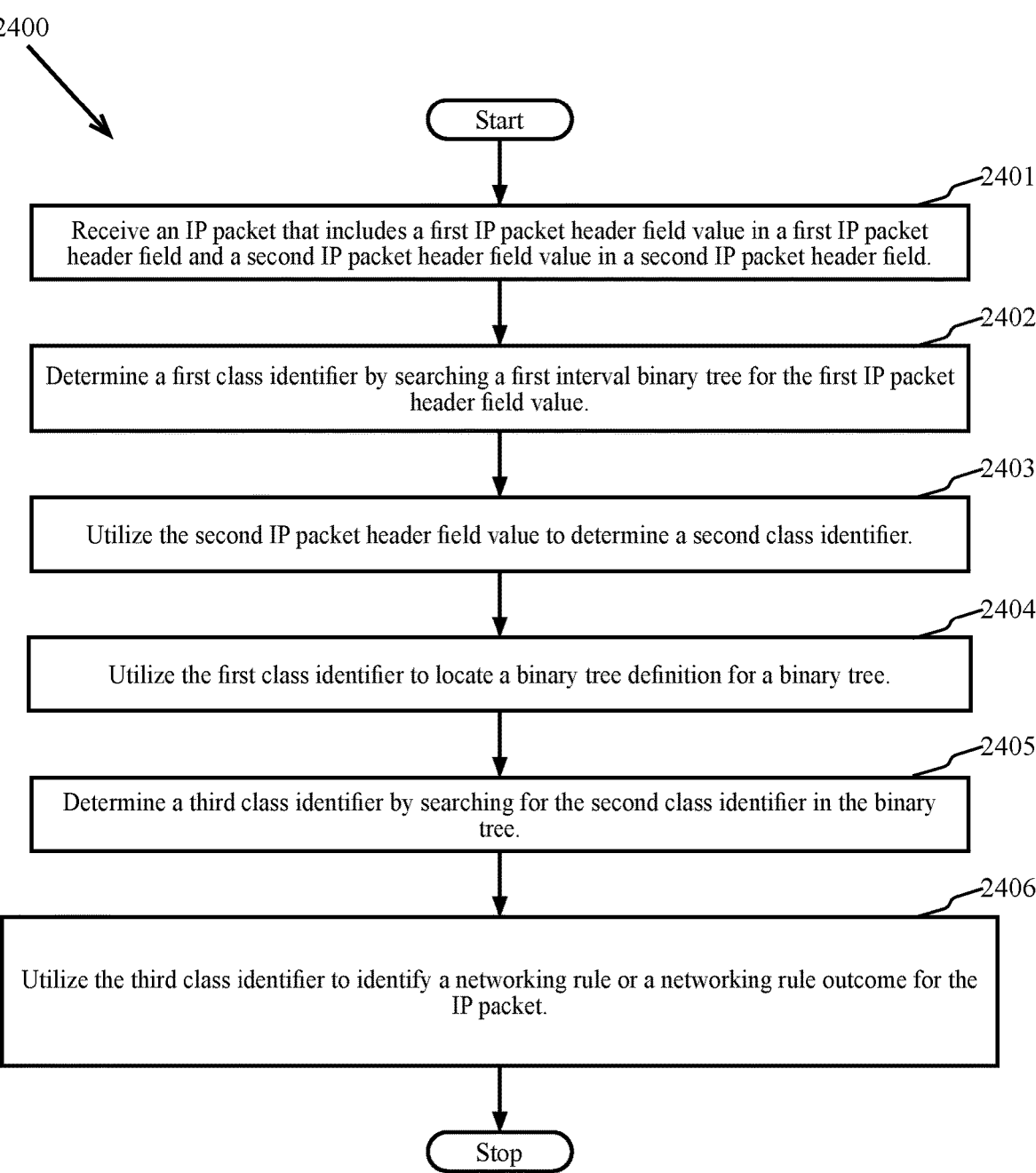
FIG. 24 is a high-level flow diagram that illustrates a method for optimizing a recursive flow classification algorithm for evaluating a network policy according to some aspects.

FIG. 24 is a high-level flow diagram that illustrates a method 2400 for optimizing a recursive flow classification algorithm for evaluating a network policy according to some aspects. After the start, at block 2401 the process can receive an IP packet that includes a first IP packet header field value in a first IP packet header field and a second IP packet header field value in a second IP packet header field. At block 2402 the process can determine a first class identifier by searching a first interval binary tree for the first IP packet header field value. At block 2403 the process can utilize the second IP packet header field value to determine a second class identifier. At block 2404 the process can utilize the first class identifier to locate a binary tree definition for a binary tree. At block 2405 the process can determine a third class identifier by searching for the second class identifier in the binary tree. At block 2406 the process can utilize the third class identifier to identify a networking rule or a networking rule outcome for the IP packet.

Aspects described above can be ultimately implemented in a networking device that includes physical circuits that implement digital data processing, storage, and communications. The networking device can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU and other semiconductor chip circuits are fabricated on the same semiconductor substrate to form a System-on-Chip (SoC). The networking device may be embodied as a single IC device (e.g., fabricated on a single substrate) or the networking device may be embodied as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk.

Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:

an ingress port configured to receive an internet protocol (IP) packet that includes a first IP packet header field value and a second IP packet header field value;

a memory configured to store a first interval binary tree definition for a first interval binary tree, and a plurality of binary tree definitions for a plurality of binary trees; and at least one processor that is configured to:

use the first IP packet header field value to determine a first class identifier and use the second IP packet header field value to determine a second class identifier in response to receiving the IP packet, the first class identifier determined by searching the first interval binary tree for the first IP packet header field value and the first class identifier identifying one of the binary trees;

determine a third class identifier by searching for the second class identifier in the one of the binary trees; and utilize the third class identifier to identify a networking rule or a networking rule outcome for the IP packet.

2. The system of claim 1, wherein:

the memory stores a second interval binary tree definition for a second interval binary tree; and the second class identifier is determined by searching the second interval binary tree for the second IP packet header field value.

3. The system of claim 1, wherein:

the IP packet further includes a third IP packet header field value in a third IP packet header field and a fourth IP packet header field value in a fourth IP packet header field;

a third interval binary tree and the third IP packet header field value are used to determine a fourth class identifier;

a fourth interval binary tree and the fourth IP packet header field value are used to determine a fifth class identifier;

the fourth class identifier indicates a second one of the binary tree definitions;

the fifth class identifier and the second one of the binary tree definitions are used to determine a sixth class identifier; and the third class identifier and the sixth class identifier are used to identify the networking rule or the networking rule outcome for the IP packet.

4. The system of claim 3, wherein:

the third class identifier indicates a third one of the binary tree definitions; and the sixth class identifier and the third one of the binary tree definitions are used to identify the networking rule or the networking rule outcome for the IP packet.

5. The system of claim 3, wherein:

the sixth class identifier indicates a third one of the binary tree definitions; and the third class identifier and the third one of the binary tree definitions are used to identify the networking rule or the networking rule outcome for the IP packet.

6. The system of claim 3, wherein:

the IP packet further includes a fifth IP packet header field value in a fifth IP packet header field;

the fifth IP packet header field value is a protocol indicator;

the fourth IP packet header field value indicates a destination port; and the fourth interval binary tree, the fourth IP packet header field value, and the protocol indicator are used to determine the fifth class identifier.

7. The system of claim 3, wherein the third IP packet header field indicates a destination IP address.

8. The system of claim 1, wherein the first IP packet header field indicates a source IP address, and the second IP packet header field indicates a destination IP address.

9. The system of claim 1, wherein:

the networking rule is one of N networking rules of a networking policy; and an amount of the memory required to store the one of the binary trees for the networking policy scales at worst linearly with N.

10. The system of claim 1, wherein the first class identifier indicates a memory location where the one of the binary trees is stored.

11. The system of claim 1 wherein:

the networking rule is one of N networking rules of a networking policy;

a maximum first field overlaps value is set for the networking policy; and no more than the maximum first field overlaps value of the first IP packet header field are allowed in the networking policy.

12. The system of claim 1 wherein:

the memory includes a plurality of pre-allocated blocks storing the binary tree definitions;

the first class identifier indicates a one of the pre-allocated blocks; and the one of the pre-allocated blocks stores all of the one of the binary tree definitions.

13. The system of claim 1 wherein:

the memory includes a plurality of pre-allocated blocks storing the first interval binary tree definition;

a cache word length segment of one of the pre-allocated blocks includes a portion of the first interval binary tree definition;

the at least one processor includes a match-action stage of a match-action pipeline circuit;

the match-action stage reads the cache word length segment; and the match-action stage uses the portion of the first interval binary tree definition to perform a part of an interval binary tree search for the first IP packet header field value.

14. The system of claim 13 wherein:

a second cache word length segment of the one of the pre-allocated blocks includes a second portion of the first interval binary tree definition;

the at least one processor includes a second match-action stage of the match-action pipeline circuit;

the second match-action stage reads the second cache word length segment; and the second match-action stage uses the second portion to perform a second part of the interval binary tree search.

15. The system of claim 1 wherein:

the memory stores a networking policy table that includes N networking rules;

the networking policy table is used to produce an interval table that associates a plurality of IP address ranges with a plurality of first class identifiers that includes the first class identifier; and the interval table is used to produce the first interval binary tree definition.

16. A system comprising:

an ingress port configured to receive an internet protocol (IP) packet that includes a source IP address and a source port indicator;

a memory configured to store a first interval binary tree definition for a first interval binary tree, a second interval binary tree definition for a second interval binary tree, and a plurality of binary tree definitions for a plurality of binary trees;

at least one processor that is configured to:

use the source IP address to determine a first class identifier and use the source port indicator to determine a second class identifier in response to receiving the IP packet, the first class identifier determined by searching the first interval binary tree for the source IP address and identifying one of the binary trees;

determine a third class identifier by searching for the second class identifier in the one of the binary trees; and utilize the third class identifier to identify a networking rule or a networking rule outcome for the IP packet, wherein the second class identifier is determined by searching the second interval binary tree for the source port indicator.

17. The system of claim 16, wherein:

the IP packet further includes a destination IP address and a destination port indicator;

a third interval binary tree and the destination IP address are used to determine a fourth class identifier;

a fourth interval binary tree and the destination port indicator are used to determine a fifth class identifier;

the fourth class identifier indicates a second one of the binary tree definitions;

the fifth class identifier and the second one of the binary tree definitions are used to determine a sixth class identifier; and the third class identifier and the sixth class identifier are used to identify the networking rule or the networking rule outcome for the IP packet.

18. A method comprising:

using a first IP packet header field value to determine a first class identifier and using a second IP packet header field value to determine a second class identifier in response to receiving an IP packet that includes the first IP packet header field value and the second IP packet header field value, the first class identifier determined by searching a first interval binary tree for the first IP packet header field value;

determining a third class identifier by searching for the second class identifier in a binary tree identified by the first class identifier; and using the third class identifier to identify a networking rule or a networking rule outcome for the IP packet.

19. The method of claim 18, wherein the second class identifier is determined by searching a second interval binary tree for the second IP packet header field value.

20. The method of claim 18, wherein:

the IP packet further includes a third IP packet header field value in a third IP packet header field and a fourth IP packet header field value in a fourth IP packet header field;

a third interval binary tree and the third IP packet header field value are used to determine a fourth class identifier;

a fourth interval binary tree and the fourth IP packet header field value are used to determine a fifth class identifier;

the fourth class identifier indicates a second binary tree definition;

the fifth class identifier and the second binary tree definition are used to determine a sixth class identifier; and the third class identifier and the sixth class identifier are used to identify the networking rule or the networking rule outcome for the IP packet.

\* \* \* \* \*